United States Patent [19]

Cooper et al.

[11] Patent Number: 5,745,915

[45] Date of Patent: Apr. 28, 1998

[54] SYSTEM FOR PARALLEL READING AND PROCESSING OF A FILE

[75] Inventors: Thomas P. Cooper, New Brighton, Minn.; James A. Elke, Thornton, Colo.; John R. Jordan, St. Paul, Minn.; Lester Y. Lee, Arden Hills, Minn.; James R. Mettling, Forest Lake, Minn.; Ralph E. Sipple, Shoreview, Minn.; Ronald Q. Smith, St. Paul, Minn.

[73] Assignee: Unisys Corporation, Blue Bell, Pa.

[21] Appl. No.: 856,026

[22] Filed: May 14, 1997

Related U.S. Application Data

[63] Continuation of Ser. No. 407,470, Mar. 17, 1995, abandoned.

[51] Int. Cl.$^6$ ........................................ G06F 12/00
[52] U.S. Cl. ........................................ 711/114; 711/157
[58] Field of Search ........................................ 395/400, 600, 395/404, 405, 441, 438, 439, 484, 495, 873, 877, 872, 880

[56] References Cited

U.S. PATENT DOCUMENTS

| | | | |
|---|---|---|---|
| 4,648,036 | 3/1987 | Gallant | 364/300 |
| 4,901,232 | 2/1990 | Harrington et al. | 364/200 |
| 4,939,644 | 7/1990 | Harrington et al. | 364/200 |
| 4,993,030 | 2/1991 | Krakauer et al. | 371/40.1 |
| 5,148,432 | 9/1992 | Gordon et al. | 395/182.05 |
| 5,179,702 | 1/1993 | Spix et al. | 395/600 |
| 5,220,569 | 6/1993 | Hartness | 371/37.7 |
| 5,239,649 | 8/1993 | McBride et al. | 395/650 |
| 5,249,279 | 9/1993 | Schmenk et al. | 395/425 |
| 5,258,984 | 11/1993 | Menon et al. | 371/10.1 |
| 5,276,808 | 1/1994 | Cheney et al. | 395/250 |
| 5,280,612 | 1/1994 | Lorie et al. | 395/600 |
| 5,287,496 | 2/1994 | Chen et al. | 395/600 |
| 5,301,279 | 4/1994 | Riley et al. | 395/275 |
| 5,313,587 | 5/1994 | Patel et al. | 395/275 |
| 5,317,731 | 5/1994 | Dias et al. | 395/600 |
| 5,325,525 | 6/1994 | Shan et al. | 395/600 |
| 5,333,305 | 7/1994 | Neufeld | 395/575 |
| 5,345,585 | 9/1994 | Iyer et al. | 395/600 |
| 5,353,404 | 10/1994 | Abe et al. | 395/164 |
| 5,361,363 | 11/1994 | Wells et al. | 395/800 |
| 5,367,675 | 11/1994 | Cheng et al. | 395/600 |
| 5,386,524 | 1/1995 | Lary et al. | 395/400 |
| 5,396,596 | 3/1995 | Hashemi et al. | 395/250 |

(List continued on next page.)

OTHER PUBLICATIONS

Chan, A. et al. "The Implementation of an Integrated Concurrency Control and Recovery Scheme," Jun. 1992, Orlando.

The Tandem Performance Group, "A Benchmark of Non-Stop SQL on The Debit Credit Transactions," 1988, Chicago.

Stearns, R.E., et al. "Distributed Database Concurrency Controls Using Before–Values," Apr. 1981, Ann Arbor.

Bayer, R., et al. "Parallelism and Recovery in Database Systems," Jun. 1980, vol. 5, No. 2, pp. 139–156.

*Primary Examiner*—Thomas G. Black
*Assistant Examiner*—M. N. Von Buhr
*Attorney, Agent, or Firm*—Charles A. Johnson; Mark T. Starr

[57] ABSTRACT

A system for parallel reading and processing of a file. The system includes multiple disks for storing the file. The disks are coupled to a data processing system via multiple input-output channels. A file buffer is established in the memory of the data processing system, wherein the file buffer is shared by an instruction processor that initiates a parallel read request and manipulates the file data once it is read, and multiple input-output processors that are coupled to the input-output channels. Multiple input requests are issued to the multiple disks to be processed in parallel. The input-output processors write file data to a first portion of the file buffer in parallel with the reading of a second portion of the file buffer by the instruction processor. Control structures provide a means for control over the input processing demands that the parallel read request is allowed to place on the system.

22 Claims, 31 Drawing Sheets

U.S. PATENT DOCUMENTS

| | | | |
|---|---|---|---|
| 5,442,752 | 8/1995 | Styczinski | 395/404 |
| 5,446,855 | 8/1995 | Dang et al. | 395/401 |
| 5,448,709 | 9/1995 | Chandler et al. | 395/872 |
| 5,481,727 | 1/1996 | Asano et al. | 395/477 |
| 5,506,977 | 4/1996 | Jones | 395/482 |
| 5,511,177 | 4/1996 | Kagimasa et al. | 395/441 |
| 5,551,032 | 8/1996 | Lyon et al. | 395/612 |
| 5,581,789 | 12/1996 | Ueno et al. | 395/840 |
| 5,584,041 | 12/1996 | Odawara et al. | 395/834 |
| 5,590,375 | 12/1996 | Sangveraphunsiri et al. | 395/841 |
| 5,613,085 | 3/1997 | Lee et al. | 395/441 |

DISK-CHANNEL-IOP TABLE

| DISK ID. | CHANNEL ID. | IOP ID. |
|---|---|---|
|  |  |  |
|  |  |  |

FIG. 15    676

CHANNEL MANAGEMENT TABLE

| CHANNEL ID. | MAX. I/O REQUESTS | I/O REQ. COUNT |
|---|---|---|
|  |  |  |
|  |  |  |

FIG. 16    678

IOP MANAGEMENT TABLE

| IOP ID. | MAX. I/O REQUESTS | I/O REQ. COUNT |
|---|---|---|
|  |  |  |
|  |  |  |

FIG. 17    680

I/O DISK AREA DESCRIPTOR    690

| DISK IDENTIFIER |
| DISK RELATIVE WORD ADDRESS |
| FILE RELATIVE WORD ADDRESS |
| DISK AREA LENGTH |
| I/O PACKET POINTER |
| NEXT I/O DISK AREA DESCR. POINTER |
| COMBINED POINTER |

FIG. 19

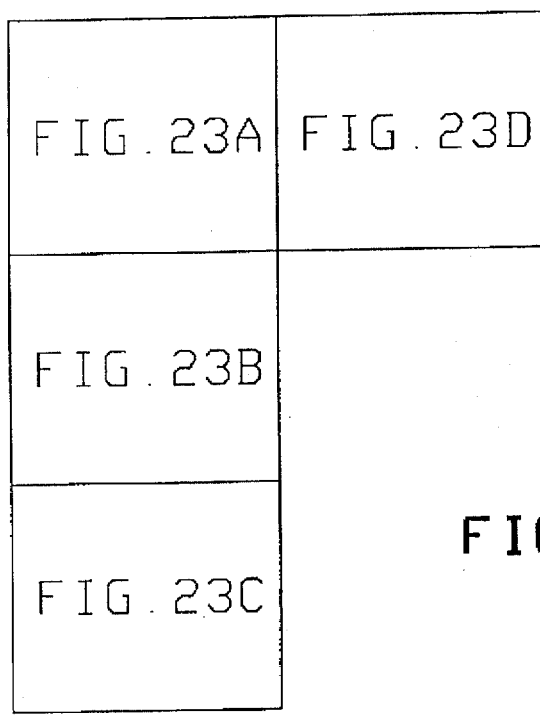
FIG. 23
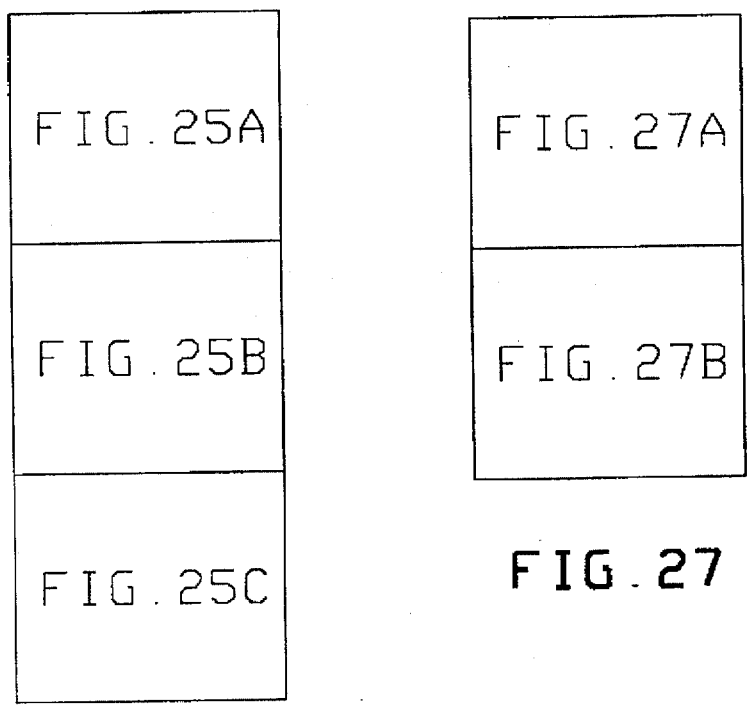
FIG. 25
FIG. 27

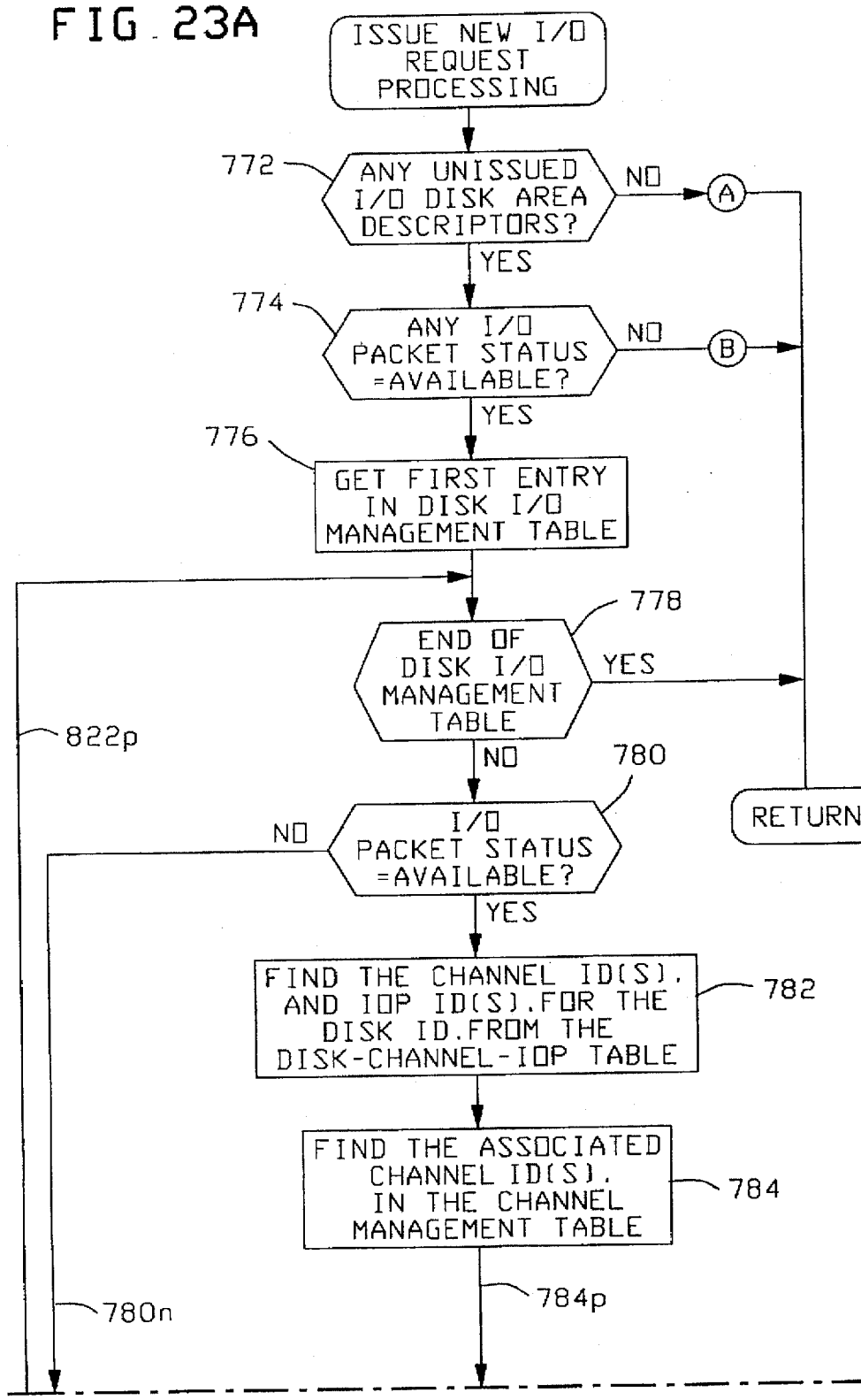

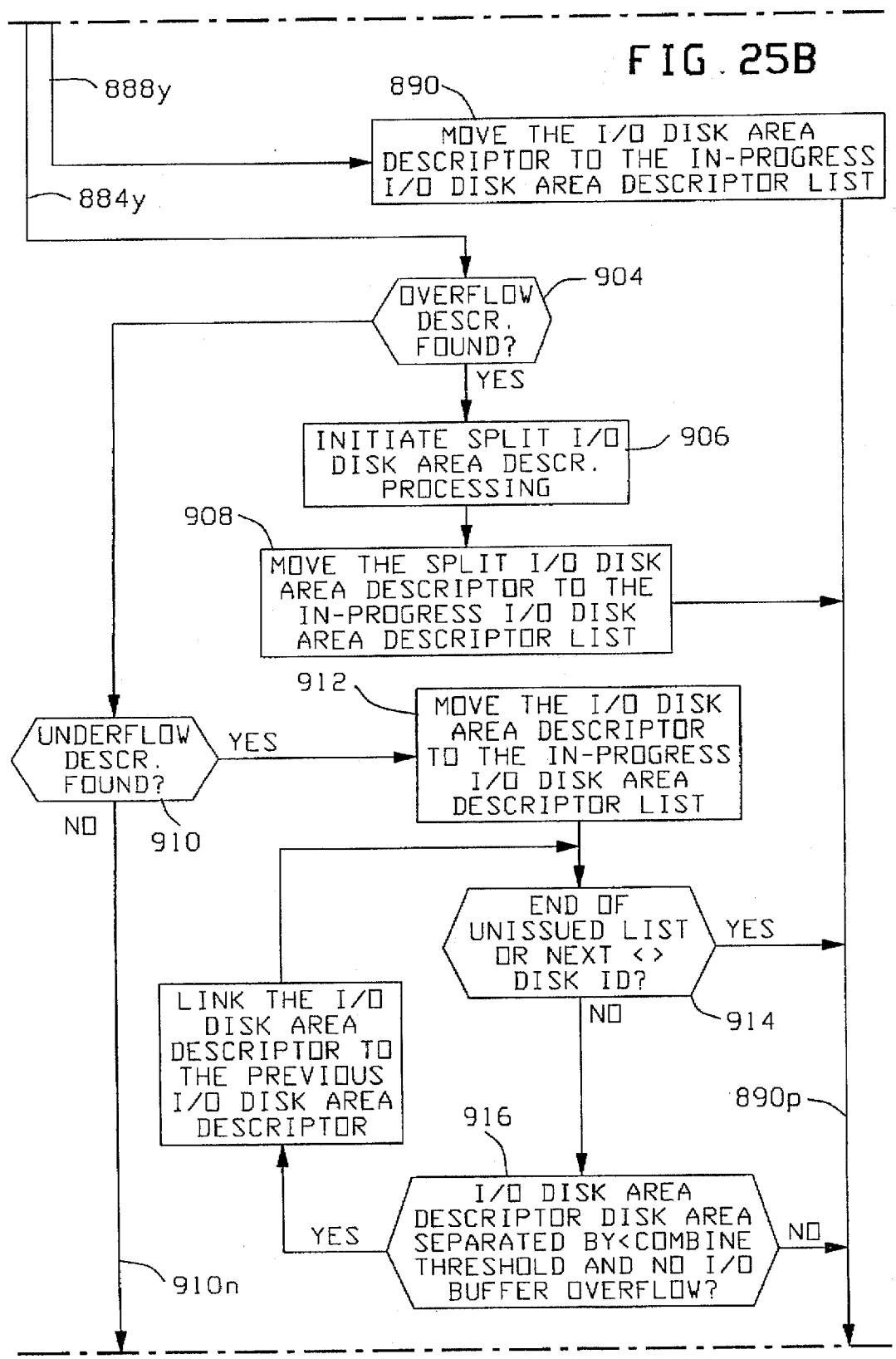

SYSTEM FOR PARALLEL READING AND PROCESSING OF A FILE

CROSS-REFERENCE TO CO-PENDING APPLICATIONS

This application is a continuation of application Ser. No. 08/407,470 filed on Mar. 17, 1995, now abandoned.

The following related co-pending patent applications are assigned to the assignee of the present application:

Concurrent Transaction And Query Processing System, Ser. No. 08/406,265 to Bierma, et al., filed concurrently with the present application on Mar. 17, 1995, pending; and System For Optionally Storing A Data File For Enhanced Query Processing, Ser. No. 08/406,278 to Braseth, et al., filed concurrently with the present application on Mar. 17, 1995, pending.

BACKGROUND

1. Field of the Invention

This invention relates generally to file management systems and more particularly to reading and processing data from a file.

2. Background Description

Businesses today recognize the importance of analyzing the information generated in their day-to-day operations for purposes of formulating plans for tomorrow's business. For example, the effectiveness of a current marketing campaign may be gauged according to the level of business activity. Therefore, it is likely that businesses will demand the most up-to-date information and demand that the information be immediately accessible. The most up-to-date business information may be desired because it may provide the best basis for formulating a business plan. Immediate accessibility is a requirement because competitive business pressures may require a rapid response.

One source of day-to-day business information is a database supporting a transaction processing system. The transaction database provides a repository for the most up-to-date information available. A useful example is an airline reservation system. The airline reservation database may provide insight to the flying habits of the airline's customers. While a wealth of useful information may be contained in the transaction database, gaining access to the information for the purpose of business planning may be extremely costly.

For the remainder of this specification, a particular request for access to a database will be classified as either a "transaction" or a "query." In a business example, a transaction might be a request for a seat reservation on a particular flight. In contrast, a query might be a request for all passengers who have specified vegetarian meals within the past year. A transaction typically involves access to a relatively small number of records of the database, whereas a query may involve access to thousands, or even millions of records. The duration of a transaction may be as short as a small fraction of a second. The duration of a query, on the other hand, may be minutes or even hours, depending upon the query and the size of the database.

Existing transaction processing systems are engineered to handle the day-to-day business operations for a company. Emphasis is placed on maximizing transaction processing throughput and guaranteeing secure and reliable data. Thus, the structure of transaction databases does not lend itself to efficient processing of some queries.

Processing a query against a large transaction system database may be very time consuming. The duration of the query may be minutes or hours because millions of records may be processed from multiple database files. Traditional query optimization techniques seek to minimize the number of records processed but do little in terms of optimizing the processing of the remaining records. Some queries require reading every record in a database, and therefore are not suitable for query optimization.

One of the major factors in the time required to process a query is the time required to read the file that comprises the database from the backing store. Traditionally, the processor manipulating the file data (such as searching the data) could process the data much faster than the data could be read from the backing store. Thus, the processor may be sitting idle while waiting for file data to process. If the time required to read a file could be reduced, a corresponding reduction in query processing time would be realized.

SUMMARY OF THE INVENTION

It would therefore be desirable to have a system that reads data from a file at a rate that approaches or exceeds the rate at which the processor can process the data.

It is an object of the invention to provide a system for parallel reading and processing of a file.

Another object of the invention is to limit the input processing demands that a parallel read of a file may place on a storage device on which the file is stored.

A further object of the invention is to limit the input processing demands that a parallel read of a file may place on a single input channel.

Yet another object of the invention is to limit the input processing demands that a parallel read of a file may place on a single input-output processor.

These and other objects are achieved in a data processing system that includes an instruction processor coupled to a memory. The instruction processor executes a file processing program, such as a database management system processing a query, that issues a parallel file read request. The parallel file read request may specify all or specified portions of the file.

The file is stored on multiple data storage devices. The multiple data storage devices are accessible via multiple input-output channels. The input-output channels are coupled to input-output processors, which in turn are coupled to the system memory. The input-output processors direct read requests to the devices specified in input-output requests. Data returned from the data storage devices is written to the memory by the input-output processors.

For the purpose of a parallel file read request, a file buffer is established in the memory. The file buffer is addressable by both the file processing program executing on the instruction processor and the input-output processors.

The input-output processors receive input-output requests from parallel file read control. The parallel file read control issues multiple input-output requests to the input-output processors for reading portions of the file from the storage devices. Data from the file is read in parallel from the storage devices and written in parallel to the file buffer.

The file processing program reads data from the file buffer and processes the data at the same time that the parallel file read control is issuing additional input-output requests. Data is read from the file at a rate that approaches or exceeds the rate at which the file processing program can process the data because the file is read in parallel from the multiple disks over the multiple input-output channels.

To prevent a parallel read request from overburdening the input-output resources of the data processing system, control is provided to limit the input demands that a parallel read request may place on the data storage devices, the input-output channels, and the input-output processors.

The system is capable of concurrent processing of multiple parallel file read requests. To prevent multiple parallel file read requests from overburdening the input-output resources of the data processing system, the multiple requests are permitted with the limitation that the requests specify files that are distinct from one another.

To optimize the processing of a parallel file read request, the input requests are generated based on the amount of space available in the file buffer to which data may be written, the physical locations of the different portions of the file, and the quantity of contiguous data residing at the different physical locations.

Still other objects and advantages of the present invention will become readily apparent to those skilled in the art from the following detailed description, wherein only the preferred embodiment of the invention is shown, simply by way of illustration of the best mode contemplated for carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 15 illustrates the content of the Disk-Channel-IOP Table;

FIG. 16 illustrates the content of the Channel Management Table;

FIG. 17 illustrates the content of the IOP Management Table;

FIG. 19 illustrates the content of an I/O Disk Area Descriptor;

DETAILED DESCRIPTION

Figure 1:
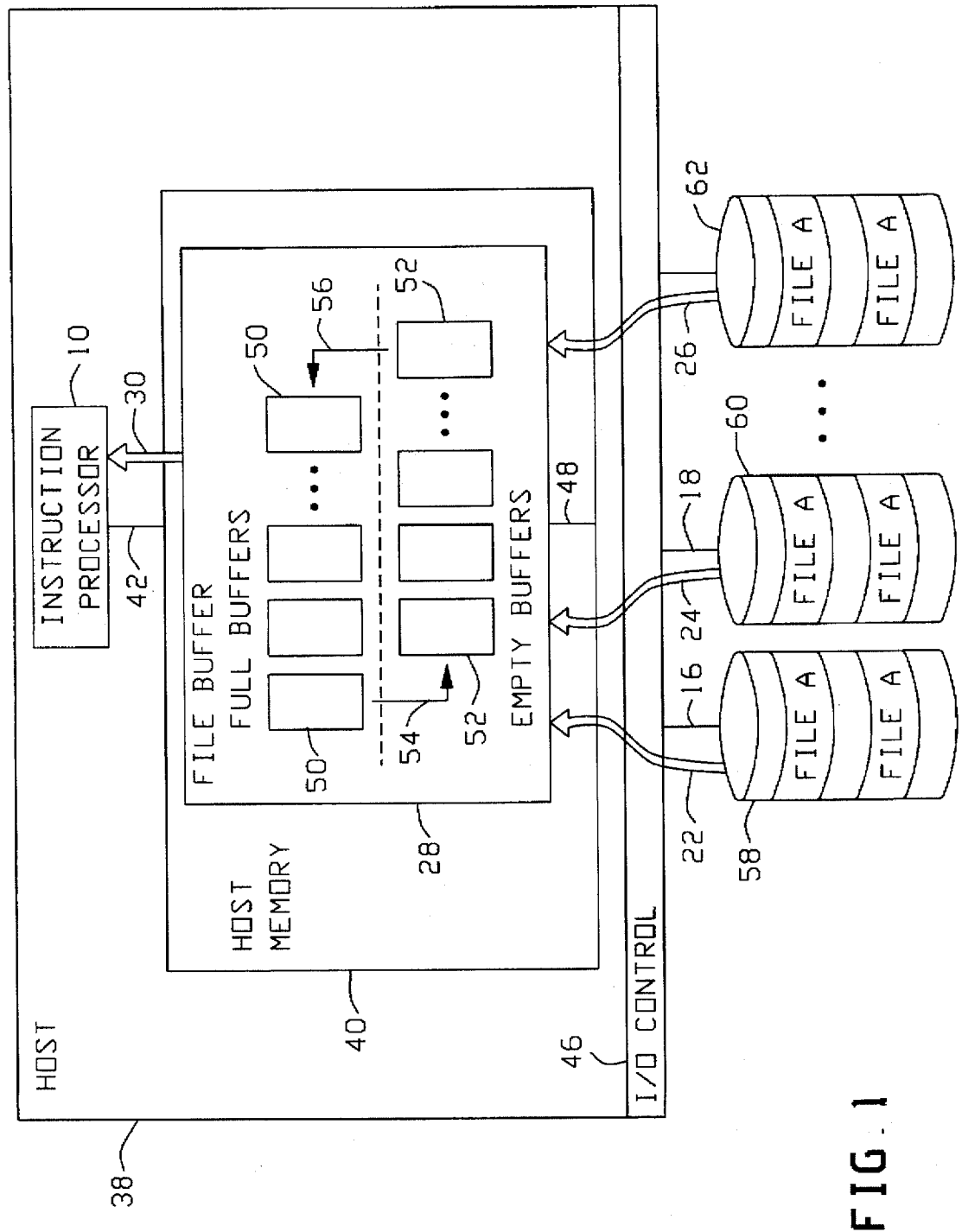
FIG. 1 is a functional block diagram of an exemplary system for parallel reading and processing of a file.

FIG. 1 is a functional block diagram of an exemplary system for parallel reading and processing of a file. An Instruction Processor 10 executes a file processing program that reads and processes a file. File A is stored on multiple Disks 58, 60, and 62 that are accessible via multiple distinct I/O Channels 16, 18, and 20. This permits File A to be read at a rate which is fast enough to keep the Instruction Processor 10 busy. I/O requests are issued asynchronous to the processing of the data from File A by the Instruction Processor. Lines 22, 24, and 26 illustrate the parallel flow of data from the Disks to the File Buffer 28. Line 30 illustrates the flow of data from the File Buffer to the Instruction Processor. The parallel I/O over Channels 16, 18, and 20 provides data in the File Buffer 28 at a rate that is fast enough to keep the Instruction Processor 10 nearly 100% busy processing the data of File A. The size of the File Buffer and the number of parallel I/O requests that are issued allow control over the I/O demands of the file processing program.

The system includes an exemplary Host 38, which is a data processing system that includes an Instruction Processor 10, a Memory 40, and an I/O Control section 46. A 2200 Series data processing system from Unisys Corporation could serve as a suitable Host. While exemplary system includes only a single Instruction Processor, those skilled in the art will recognize that additional Instruction Processors could be added to the system to provide concurrent processing.

The Instruction Processor 10 is coupled to a Memory 40 via Line 42. The manner of coupling could be either a direct or bussed connection. Lines 42 provides read and write access to the Memory.

The Disks 58, 60, and 62 are coupled to the I/O Control 46 section of the Host 38 via the Channels 16, 18, and 20. I/O Control is coupled to the Memory 40 via Line 48. Line 48 may provide either bussed or direct access to the Memory for the I/O Control. Coupling Line 48 permits I/O Control to read from and write to the Memory.

File Buffer 28 control software manages the Full Buffers 50 and the Empty Buffers 52. The data in the Full Buffers is processed by the file processing program while data from File A is being read from the Disks 58, 60, and 62 and written to the Empty Buffers. Processing of the Full Buffers by the Instruction Processor 10 is asynchronous to the filling of the Empty Buffers by the I/O Control 46 and therefore may proceed in parallel. When all the data in a Full Buffer has been processed, the Buffer is returned for use as an Empty Buffer as indicated by directional Line 54. Similarly, when an Empty Buffer becomes filled with data, it is provided as a Full Buffer for processing.

Figure 2:
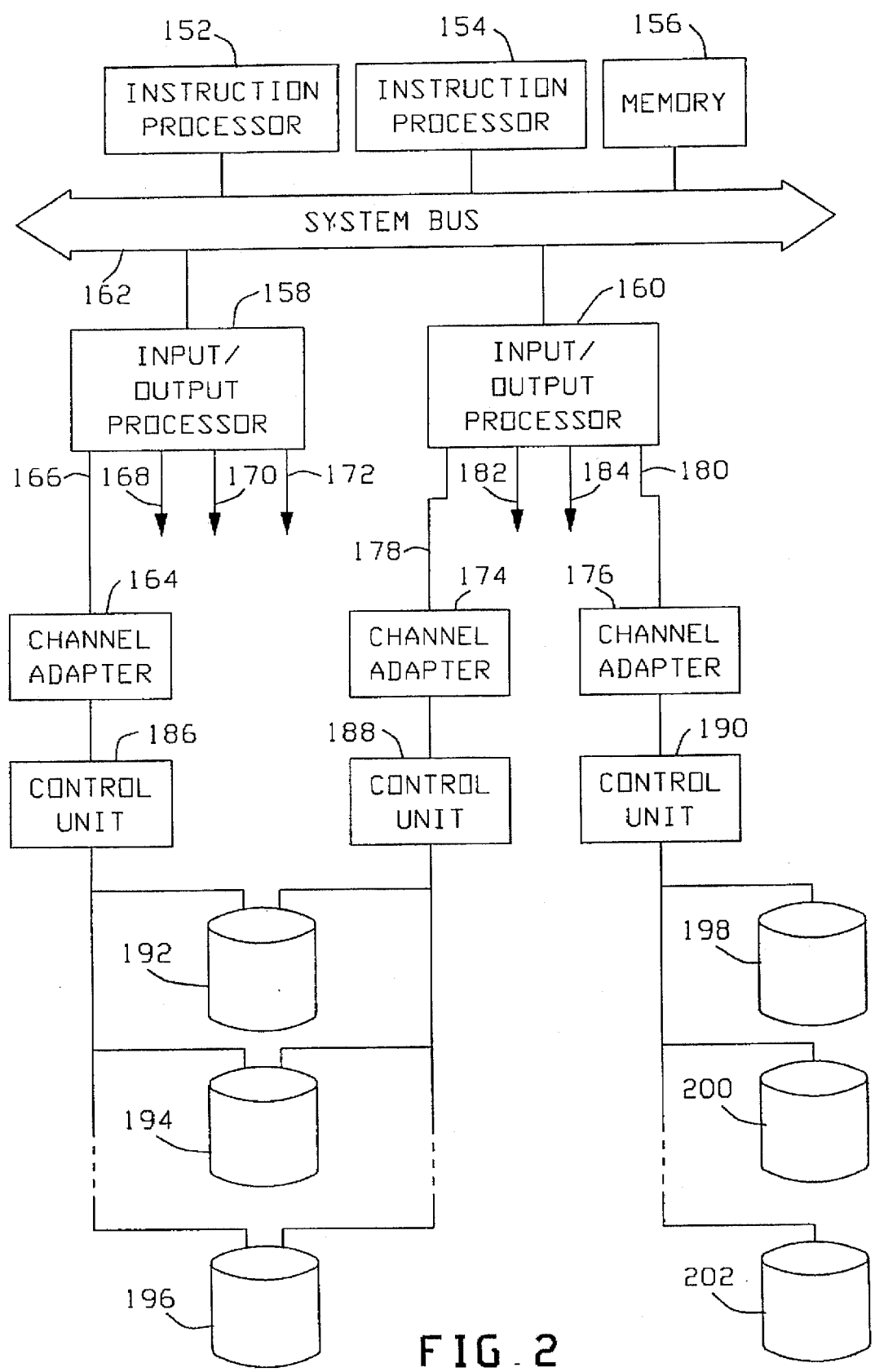
FIG. 2 is an exemplary Host system architecture along with multiple disk storage subsystems.

FIG. 2 is an exemplary Host system architecture along with multiple disk storage subsystems. The 2200/500 Series data processing system that is commercially available from Unisys adheres to such a system architecture. The system includes two Instruction Processors referenced as 152 and 154, a Memory 156, and two Input/Output Processors (IOPs) 158 and 160, coupled to a System Bus 162. Software executing on the Instruction Processors may initiate Input/Output (IO) requests to either of the IOPs. The IOPs control the flow of data input to and output from the system and have access to the Memory 156.

Each of the IOPs has four ports available for I/O channels. Channel Adapter 164 is coupled to IOP 158 via Line 166. Lines 168, 170, and 172 are shown to illustrate additional IO channels. IOP 160 is shown coupled to two Channel Adapters, 174 and 176, via Lines 178 and 180. Lines 182 and 184 illustrate the additional 10 channels available on IOP 160. A Channel Adapter provides an interface for an IOP to devices accessible according to a specific protocol, such as Block Mux or SCSI. The exemplary Channel Adapters illustrate Block Mux channels. Other types of 10 channels could be used in accordance with the present invention.

Each of the Channel Adapters 164, 174, and 176 coupled to its respective Control Unit, 186, 188, and 190. Each Control Unit provides access to its respective string of disks. Control Units 186 and 188 both provide access to Disks 192, 194, and 196. Thus, Disks 192, 194, and 196 are accessible via IOP 158 in combination with Channel Adapter 164, and accessible via IOP 160 in combination with Channel Adapter 174. Control Unit 190 provides access to Disks 198, 200, and 202.

Figure 3:
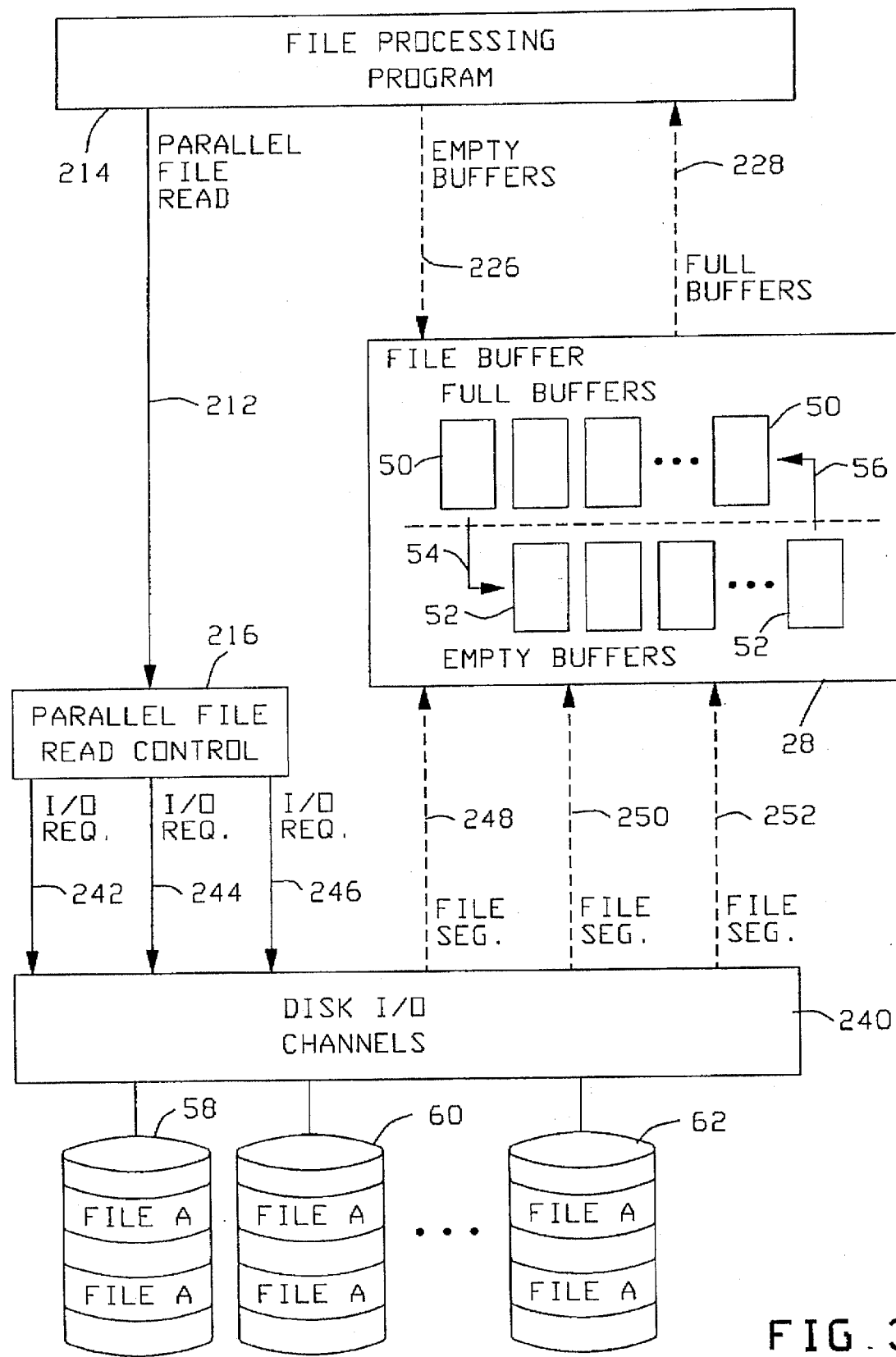
FIG. 3 is a data-flow diagram that illustrates the flow of data between the software components and the data storage devices in a system that provides parallel reading and processing of a file.

FIG. 3 is a data-flow diagram that illustrates the flow of data between the software components and the file storage devices in a system that provides for parallel reading and processing of a file. Solid directional lines represent a request or passing of control, and dashed directional lines represent the flow of data in response to processing a request. The File A that is referenced by the file processing program is stored on Disks 58 and 62 (in addition to the intervening Disks represented by the ellipsis).

A Parallel File Read request 212 is initiated by a File Processing Program 214. The File Processing Program may be an application that requires File A to be read, such as for a query to be processed against a database. The request is provided to the Parallel File Read Control 216 to manage the reading of File A. Empty Buffers 52 are provided to the Parallel File Read Control as shown by Line 226, and Full Buffers 50 are returned to the File Processing Program for processing as shown by Line 228.

File I/O requests are directed to the Disk I/O Channels 240 as shown by Lines 242, 244, and 246. In return, segments of the file that comprise File A are written to Empty Buffers 52 in the File Buffer 28. Lines 248, 250, and 252 shows segments being written in parallel to the File Buffer. It should be noted that the segments are actually written directly to the Memory 40 by the IOPs 158 or 160. Multiple File I/O Requests are issued by the Parallel File Read Control over the multiple Channels 16, 18, and 20. Lines 242, 244, and 246 respectively illustrate the I/O requests being issued for the multiple Channels, and Lines 248, 250, and 252 respectively illustrate the return of segments of File A. The Disk I/O Channel block 240 represents the components that provide a unique data path to the coupled Disk, such as the IOPs 158 and 160, Channel Adapters 164, 174, and 176, and Control Units 186, 188, and 190.

File processing performance is improved in two ways. First, the striping of File A permits multiple I/O requests to be issued and processed in parallel. This results in File A being read into the File Buffer 28 at a very high rate. Second, while the File Processing Program 214 is performing the data of File A that is available in the Full Buffers 50, Empty Buffers 52 are being filled with data.

Figure 4:
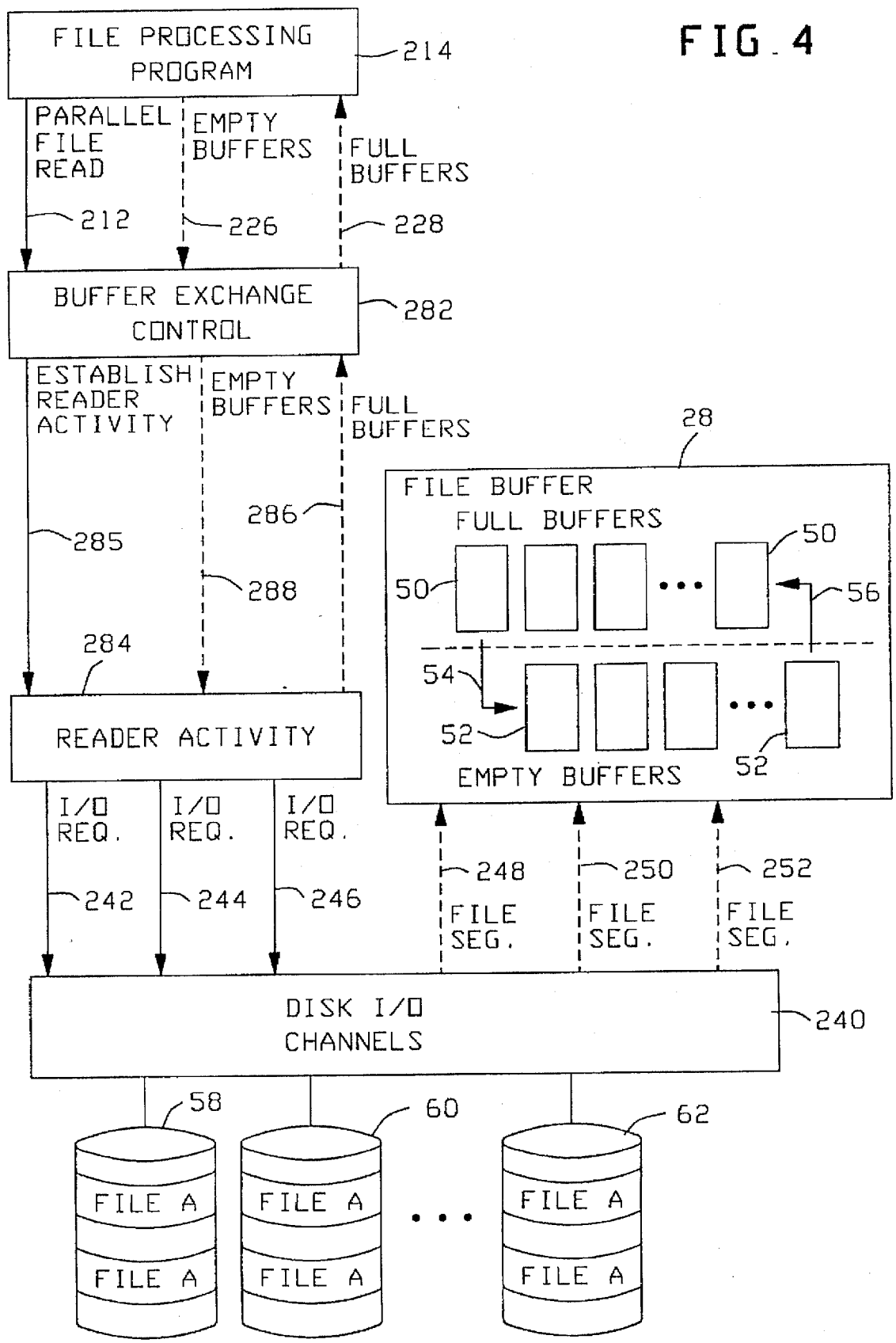
FIG. 4 is a data-flow diagram that illustrates the flow of data between the software components and the file storage devices in a system that provides parallel reading and processing of a file.

FIG. 4 is a data-flow diagram that illustrates the flow of data between the software components and the file storage devices in a system that provides parallel reading and processing of a file. FIG. 4 is similar to FIG. 3, except that the Parallel File Read Control 216 has been expanded to illustrate further control components. The two additional components are Buffer Exchange Control 282 and the Reader Activity 284. The Reader Activity is established as an independent process by the Buffer Exchange Control. Line 285 shows the establishment of the Reader Activity.

The File Processing Program exchanges Empty Buffers for Full Buffers with the Buffer Exchange Control as shown by Lines 226 and 228. The Reader Activity Exchanges Full Buffers for Empty Buffers as shown by Lines 286 and 288. The independent Reader Activity allows the File Processing Program to process data of File A in parallel with the processing of the I/O requests 242, 244, and 246.

Figure 5:
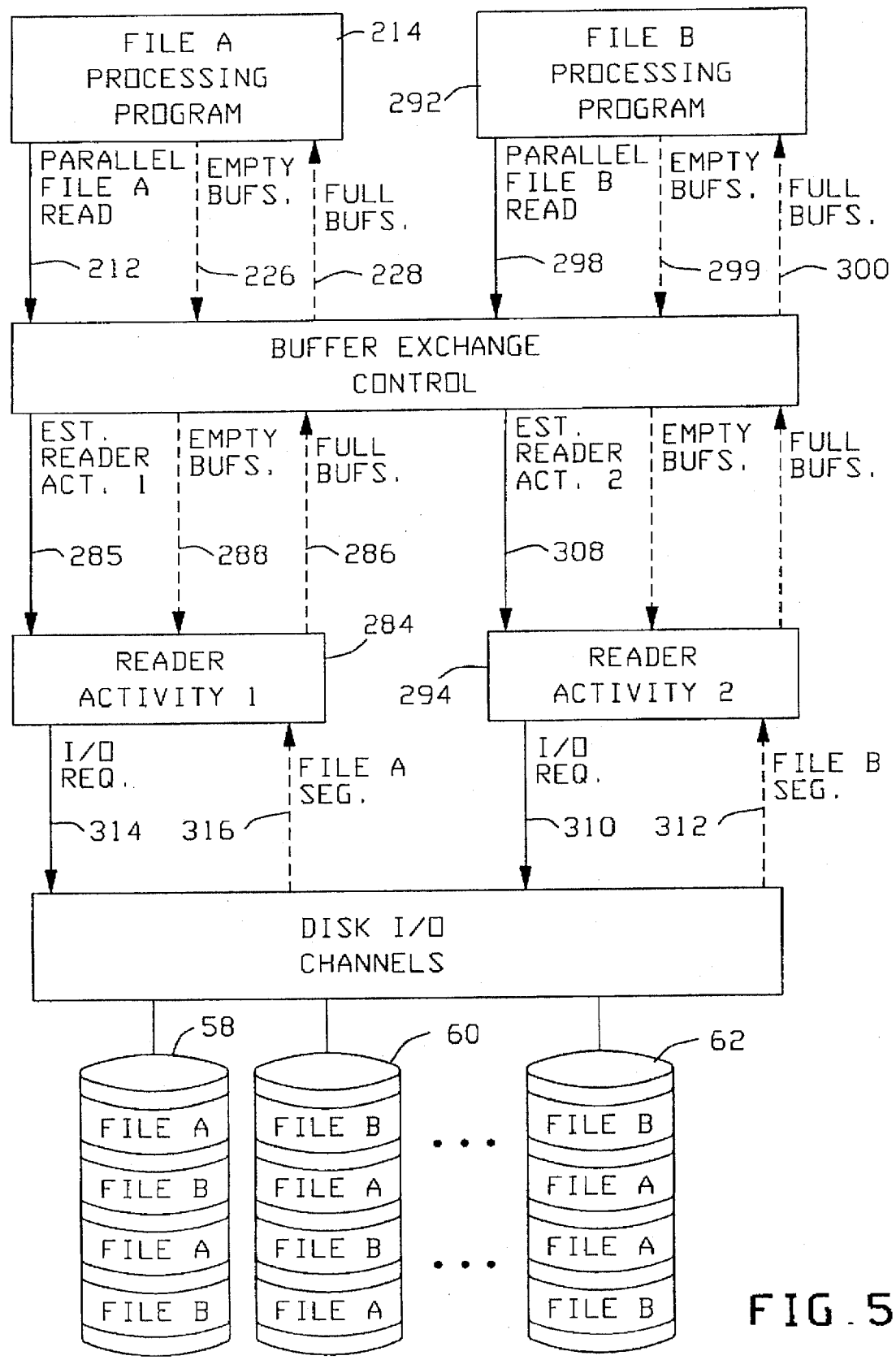
FIG. 5 is a data-flow diagram that illustrates the flow of data between the software components and the data storage devices in a system that provides parallel reading and processing of multiple files by multiple file processing programs.

FIG. 5 is a data-flow diagram that illustrates the flow of data between the software components and the data storage devices in a system that provides parallel reading and processing of multiple files by multiple file processing programs. The system of FIG. 5 is similar to that of FIG. 4. However, FIG. 5 includes multiple File Processing Programs, 214 and 292, multiple Reader Activities, 284 and 294, and an additional File B. File B is also striped across multiple Disks 58, 60, and 62.

File B Processing Program 292 initiates Parallel File B Read with the Buffer Exchange Control 282 as shown by Line 298, and Empty Buffers 52 are provided to Buffer Exchange Control as shown by Line 299. Full Buffers 50 are returned to File B Processing Program as shown by Line 300. The present invention enforces a limit of one Parallel Read Request per file.

Buffer Exchange Control 282 manages multiple queries. A set of Empty Buffers 52 that is distinct from the Empty Buffers provided for processing the Parallel File A Read request is provided for processing Parallel File B Read request.

Line 308 shows the establishment of Reader Activity 2, referenced as 294. Reader Activity 2 initiates I/O Requests for reading segments from File B as shown by Line 310. Line 312 shows the return of segments for File B. Line 314 represents the collection of I/O Requests on Lines 242, 244, and 246. Similarly, Line 316 represents the return of segments of File A via the collection of Lines 248, 250, and 252. I/O Request Line 310 represents a similar collection of I/O requests generated for File B for the respective Channels 16, 18, and 20, and Line 312 represents a similar return of segments for File B.

Figure 6:
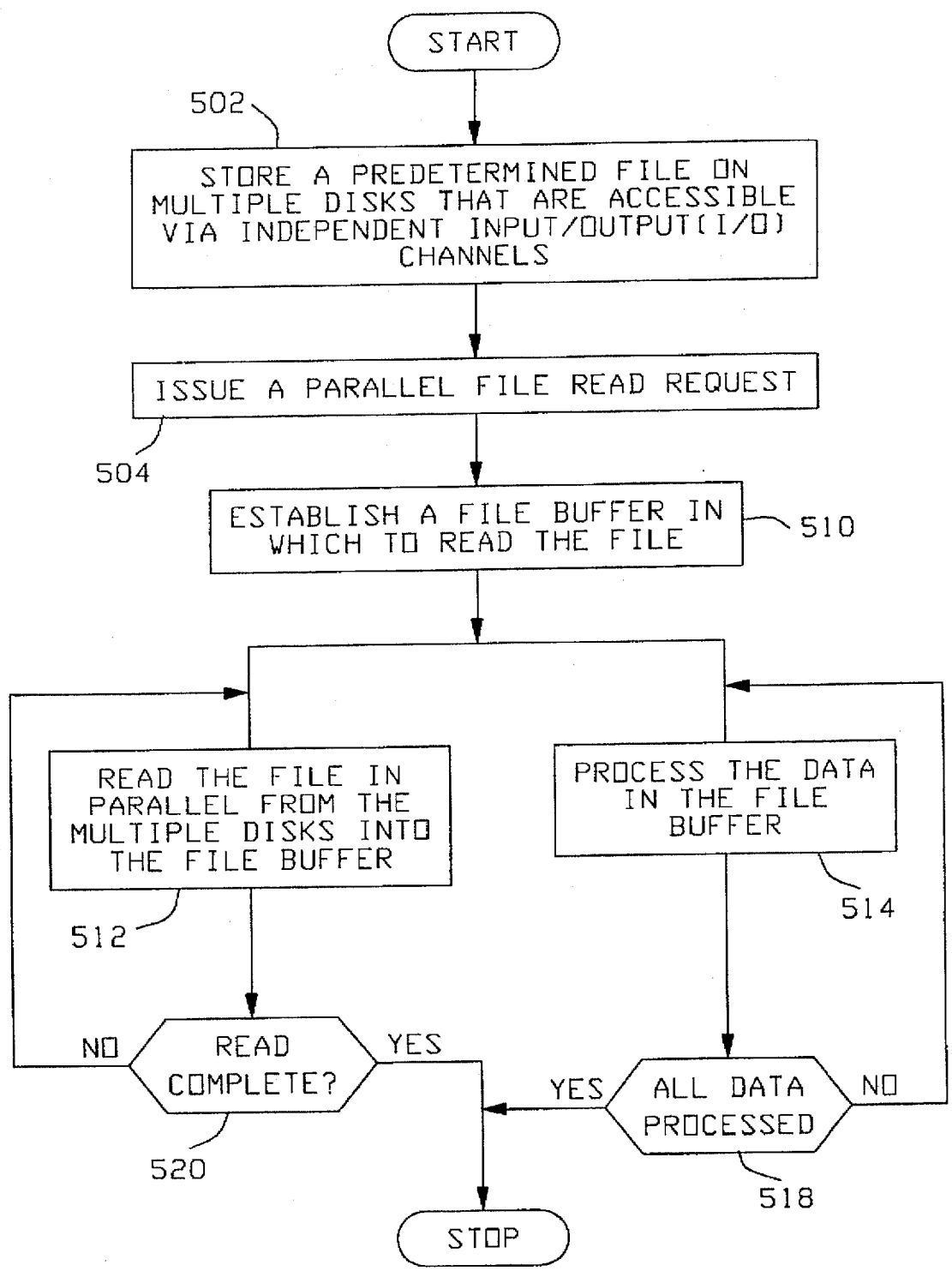
FIG. 6 is a flowchart of the overall processing for parallel reading and processing a file.

FIG. 6 is a flowchart of the overall processing for parallel reading and processing a file. The process described in FIG. 6 permits file data to be processed quickly while allowing control of the I/O resources used in processing a parallel file read request such that the input/output resources are not monopolized by the parallel file read. Two of the fundamental steps of the process consist of storing the file on multiple Disks 58, 60, and 62, (also referred to as "striping") and performing the application processing of the file data in parallel with reading the file data. Striping the file allows the file to be read very quickly.

Step 502 specifies storing the file on multiple Disks 58, 60, and 62 on multiple Channels 16, 18, and 20. The objective of striping the file is to allow for reading the file at a rate that is equal to or greater than the Processor 10 can process the data. At Step 504 a Parallel File Read request is issued to read a file.

At Step 510, a File Buffer 28 is established for use by the File Processing Program 214. After the File Buffer is established, two processing loops proceed in parallel.

Step 512 reads the file into the File Buffer 28. Multiple I/O requests are initiated over the multiple Channels 16, 18, and 20. As the data becomes available in the File Buffer 28, the File Processing Program 214 may immediately process the file data. Because the file is striped, it may be read at a rate that is fast enough to keep the Instruction Processor 10. That is, the File Processing Program should not have to wait for data to be searched, except for the first Full Buffers 50 returned. At the same time that the File Buffer is being searched by the Instruction Processor, additional I/O requests may be issued by the Reader Activity 284. If there is still more expected to be searched, decision Step 518 returns control to Step 514. Step 520 tests whether the read of the file is complete. If not, control is returned to Step 512 to issue more I/O requests.

Figures 7, 7A, 7B:
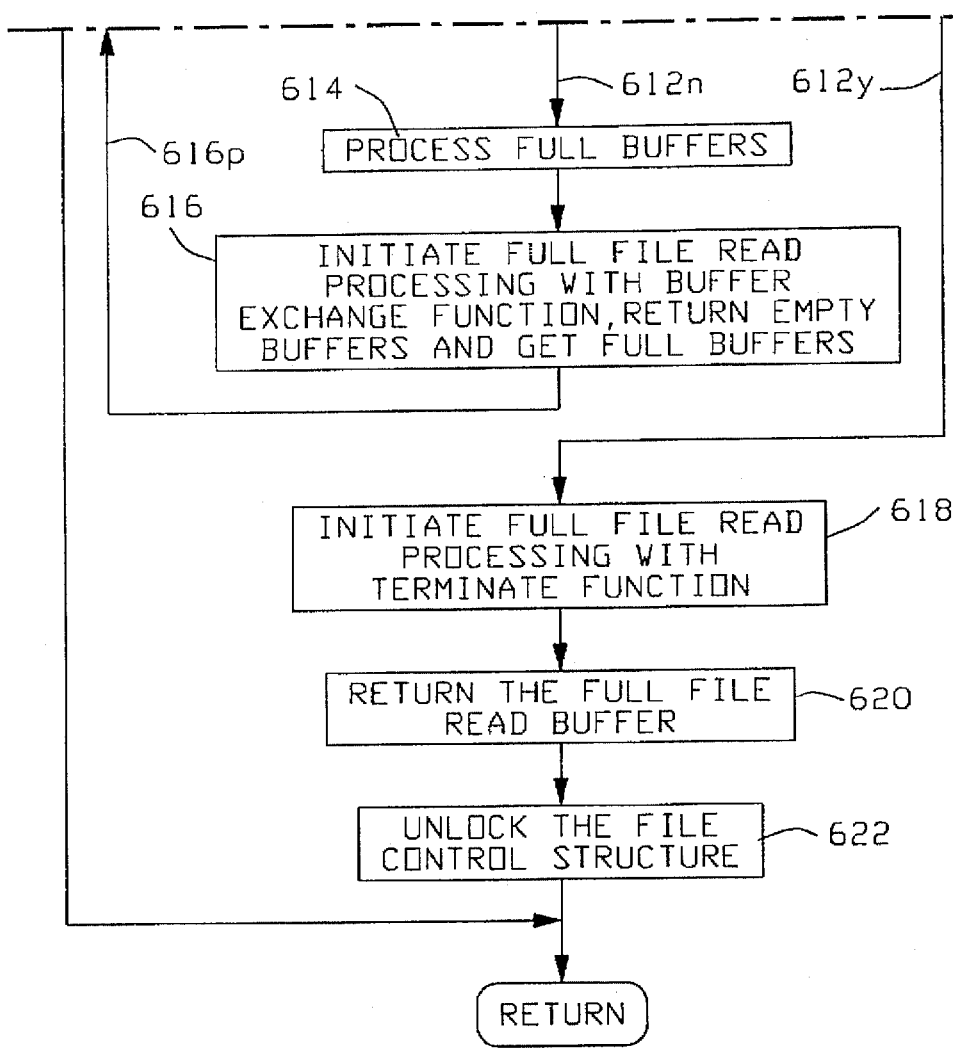
FIG. 7 shows the relationship between FIGS. 7A and 7B which comprise a flowchart of File Processing Program.
Figure 7A:
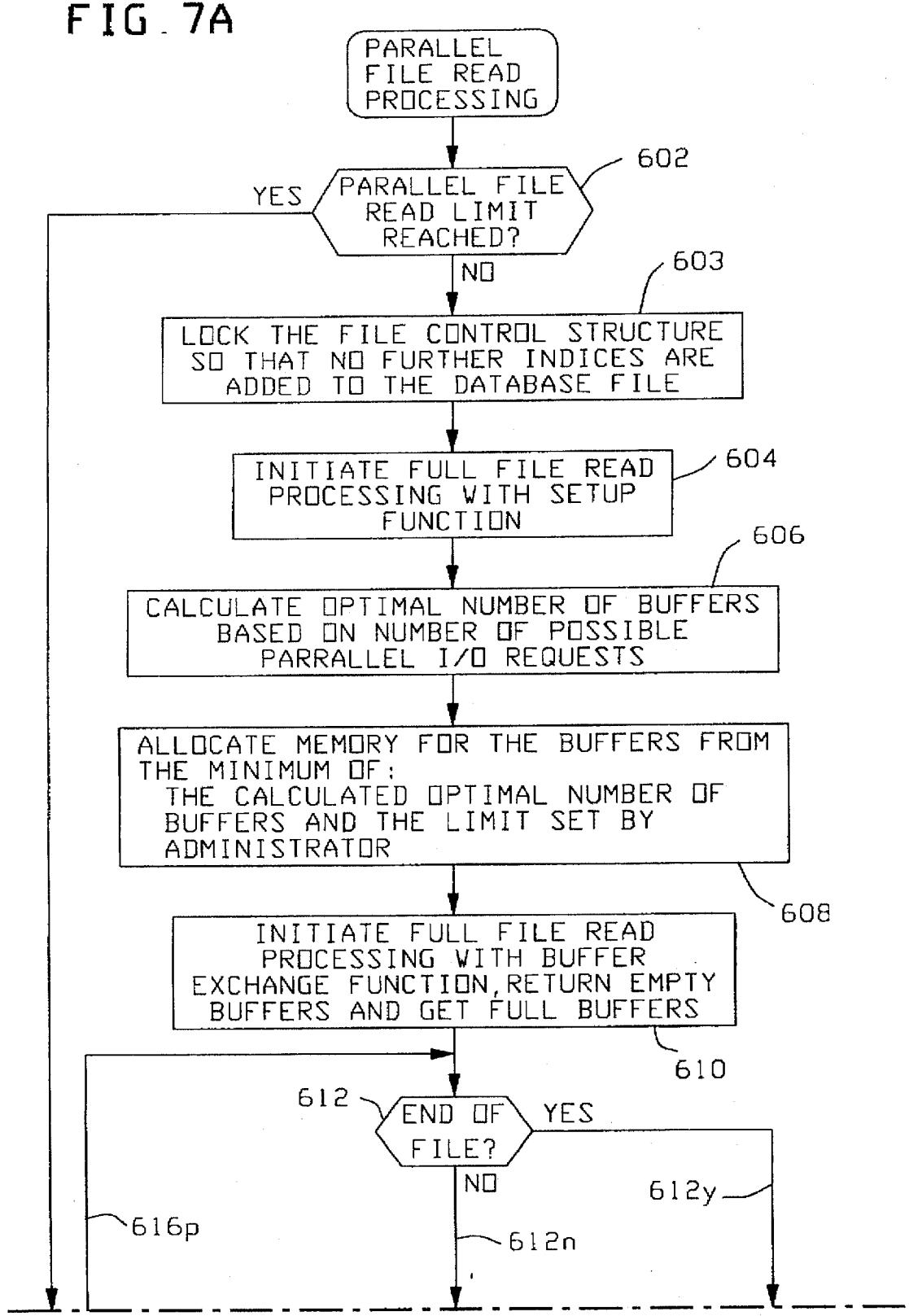

FIG. 7 shows the relationship between FIGS. 7A and 7B which comprise a flowchart of File Processing Program 214. The File Processing initiates a Parallel File Read request with the Buffer Exchange Control 282 for the parallel reading and processing of a file. File Processing also coordinates with Buffer Exchange Control to set up the File Buffer 28, exchange Empty Buffers 52 for Full Buffers 50, and process the file data returned in the Full Buffers.

Decision Step 602 tests whether the Parallel File Read Limit has been reached. This limit is set by a system administrator to bound the number of Parallel File Read requests that may be processed concurrently. This helps prevent such requests from overloading the system.

Step 603 locks the file control structure that is associated with the specified table so that no indices are added to the table while the search is being performed. Full File Read Control Processing is initiated at Step 604 with a Setup function which establishes the Reader Activity 284 and returns the maximum number of I/O requests that will be concurrently issued. This maximum number of I/O requests in the exemplary embodiment is twice the number of Disks 58, 60, and 62 across which File A is striped. Step 606 calculates the optimal number of Buffers based on the returned maximum number of I/O requests. In the exemplary system the number of Buffers is one more than the maximum number of I/O requests. Step 608 allocates memory for the desired number of Buffers. The amount of memory allocated may be less than that required for the optimal number of Buffers if the system administrator has set a lower limit. A lower limit may be specified when it is desired to limit the impact of the Parallel File Read request on other system activities.

Step 610 initiates Full File Read Processing with a Buffer Exchange function to provide the Reader Activity 284 with Empty Buffers 52 and wait for Full Buffers 50. Upon return of Full Buffers, decision Step 612 tests whether the end of the file has been reached. If there is more data in the file to process, control is directed to Step 614. Step 614 processes the data in the Full Buffers according to the needs of the application of the File Processing Program 214. Step 616 initiates Full File Read Processing with the Buffer Exchange function to return the Empty Buffers (the Full Buffers that were just processed) and await more Full Buffers to process. Control is then returned to decision Step 612.

When all the portions of the requested file have been processed, control is directed to Step 618 where the Full File Processing is initiated with a Terminate function to terminate the Reader Activity 284. Step 620 returns the memory allotted to the File Buffer 28 to the system and Step 622 unlocks the file control structure. Control is then returned to the File Processing Program 214.

Figure 8:
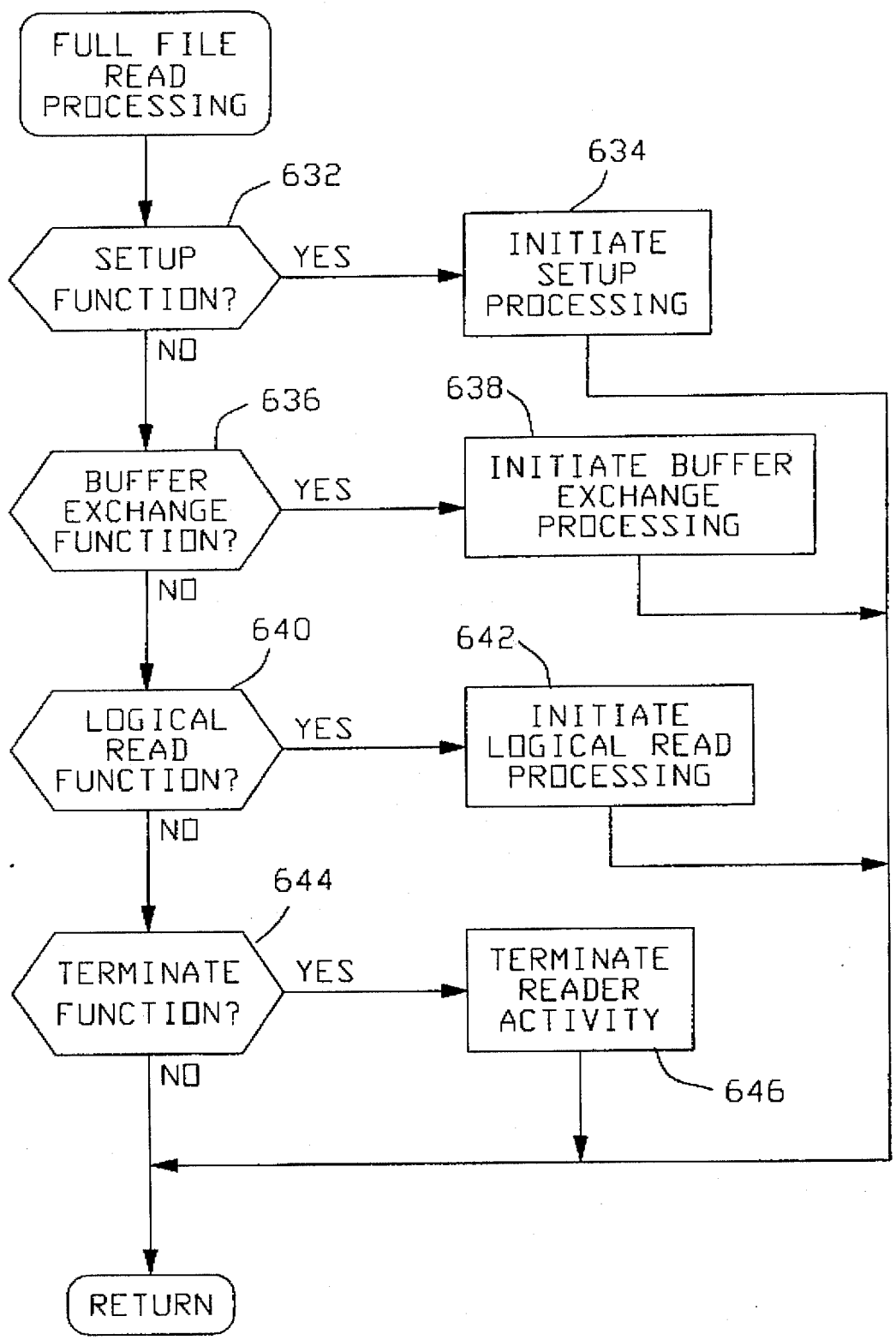
FIG. 8 is a flowchart of the Full File Read Processing.

FIG. 8 is a flowchart of the Full File Read Processing. Four functions are available: Setup, Buffer Exchange, Logical Read, and Terminate. The functions of Setup, Buffer Exchange, and Terminate are used for reading a file without regard to the logical relative relationship between segments of the file (referenced as a physical read), and the Logical Read function is used for a logical read. A sequence of tests is performed to determine the function to perform, as shown by decision Steps 632, 636, 640, and 644. For a Setup function, Setup Processing is initiated at Step 634; for a Buffer Exchange function, Buffer Exchange Processing is initiated at Step 638; for a Logical Read function, Logical Read Processing is initiated at Step 642; and for a Terminate function, the Reader Activity 284 is terminated at Step 646.

Figure 9:
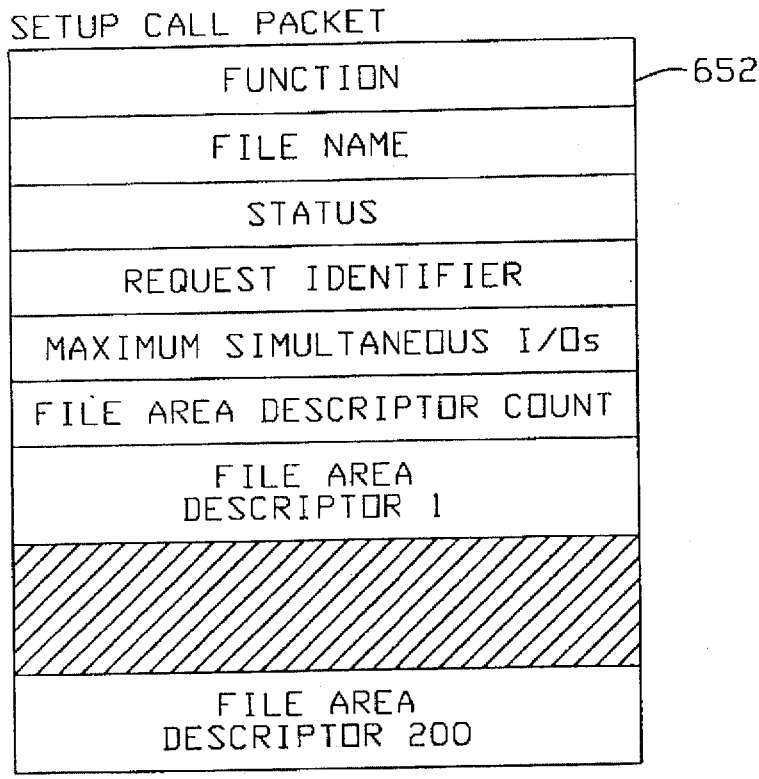
FIG. 9 shows the parameters contained in a Setup Call Packet.

Full File Read Processing is initiated with a call packet that contains parameters that vary according to the specified function. FIG. 9 shows the parameters contained in a Setup Call Packet 652. For the purposes of this specification, a Request is one or more invocations of Full File Read Processing that, as a whole, return all the specified areas of a particular file. Each of the invocations of Full File Read Processing for one Request are referred to as Calls. The fields in the Setup Call Packet are defined as follows:

Function—a code that specifies the Setup function.
File Name—identifies the particular file to read.
Status—a code returned to indicate the status of the call.
Request Identifier—a code returned from the Setup call to identify the parallel read.
Maximum Simultaneous I/Os—is returned from the Setup call to designate the number of simultaneous I/O requests that may be made for the Request.
File Area Descriptor Count—is the number of File Area Descriptors in the call packet.
File Area Descriptors 1–200—describe the areas of the file that are to be read. Up to 200 File Area Descriptors may be specified.

Figure 10:
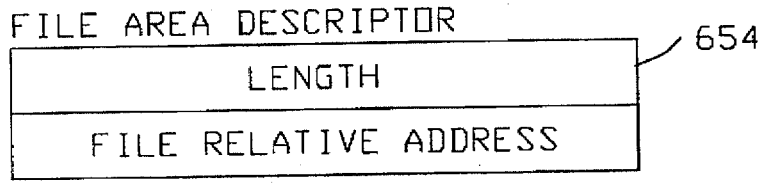
FIG. 10 show the format and content of a File Area Descriptor.

FIG. 10 shows the content of a File Area Descriptor 654. The Length and File Relative Address fields may vary according to the units of granularity of the specified file. The fields may designate words for word addressable files or segments for segment addressable files.

Figure 11:
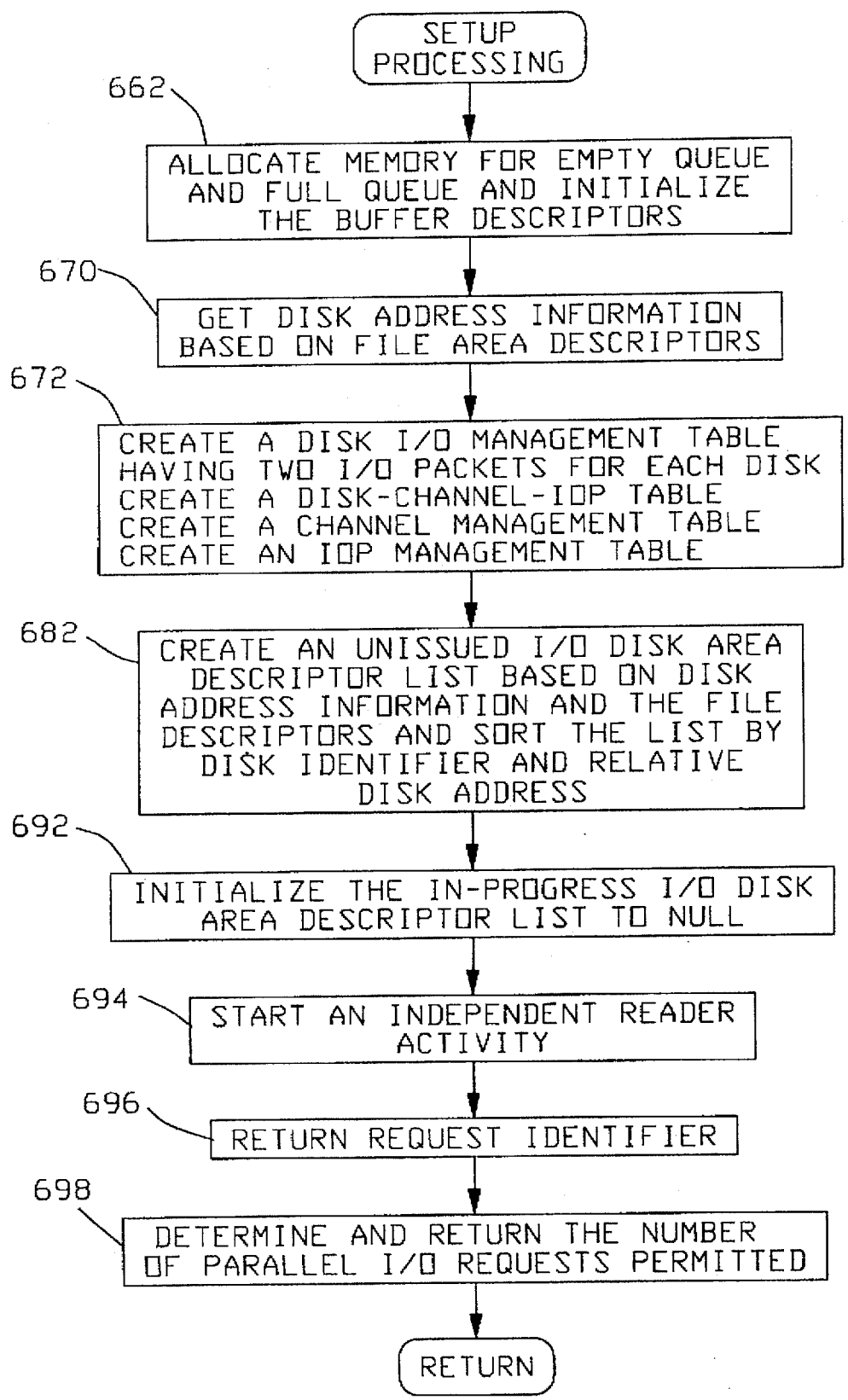
FIG. 11 is a flowchart of the Setup Processing.

FIG. 11 is a flowchart of the Setup Processing. Setup Processing is initiated from Full File Read Processing to establish the control structures required to perform a parallel read of a file.

Figure 12:
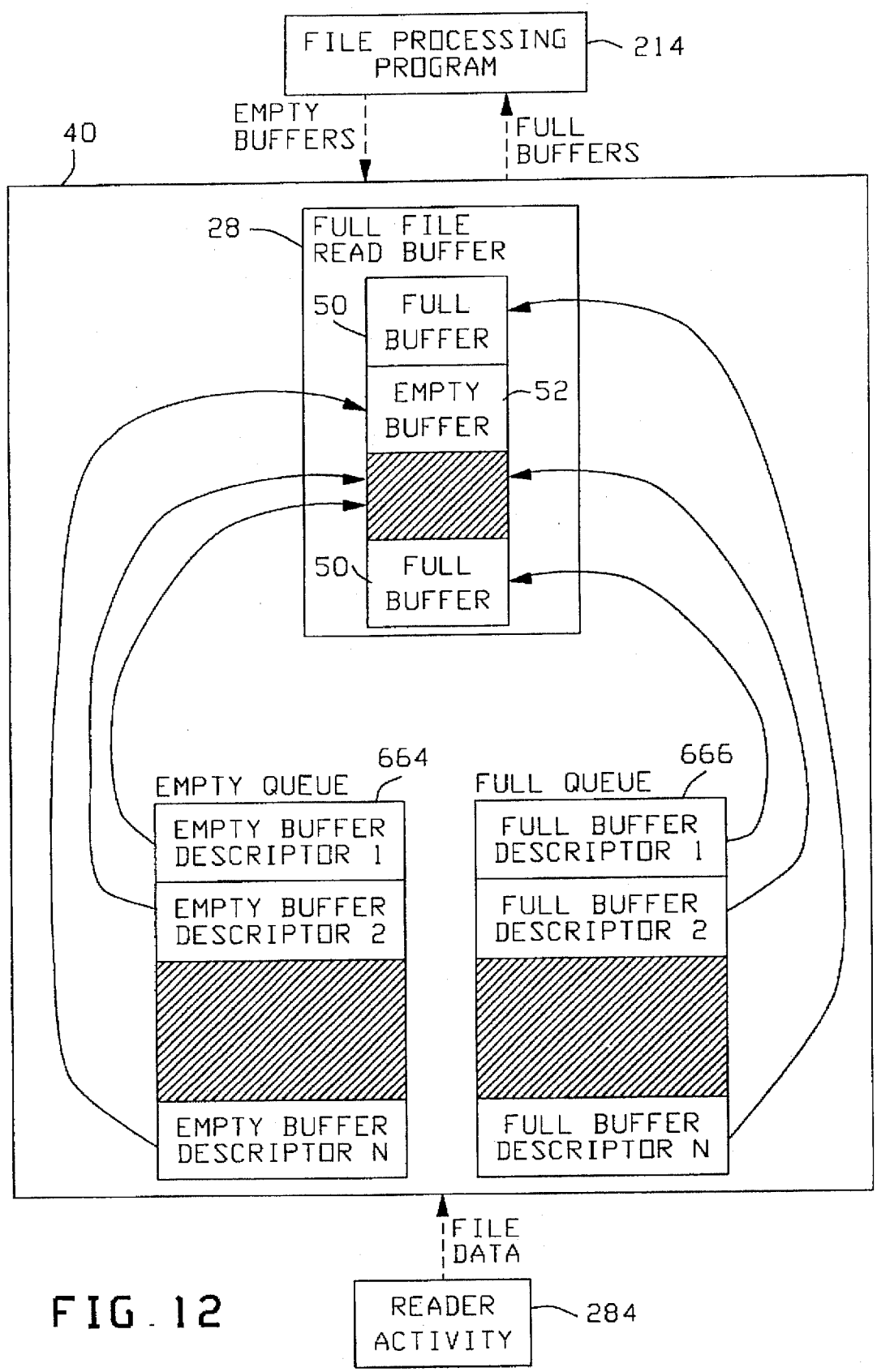
FIG. 12 illustrates the relationship between the Empty Queue, the Full Queue, the File Buffer, the File Processing Program, and the Reader Activity.

Step 662 allocates memory for the Empty Queue 664 and Full Queue 666 as shown in FIG. 12. The entries in the Empty Queue and Full Queue are used to reference distinct ones of Buffers in the File Buffer 28.

FIG. 12 illustrates the relationship between the Empty Queue 664, the Full Queue 666, the File Buffer 28, the File Processing Program 214, and the Reader Activity 284. The File Processing Program receives Full Buffers 50 for application processing and returns Empty Buffers after application processing of a Full Buffer is complete. Thus, a Full Buffer becomes an Empty Buffer after the File Processing Program has processed the Buffer.

The File Buffer 28 consists of Empty Buffers 52 and Full Buffers 50. During processing of a Parallel File Read request, the Empty Buffers 52 are receiving file data as a result of I/O requests issued by the Reader Activity 284. A the same time, the Full Buffers 50 are being processed by the File Processing Program 214.

The Empty Queue 664 consists of N Empty Buffer Descriptors 668. The Buffer Descriptors point to an Empty Buffer 52 in the File Buffer 28. The Full Queue 666 consists of N Full Buffer Descriptors, each of which references a Full Buffer 50 in the File Buffer.

Figure 13:
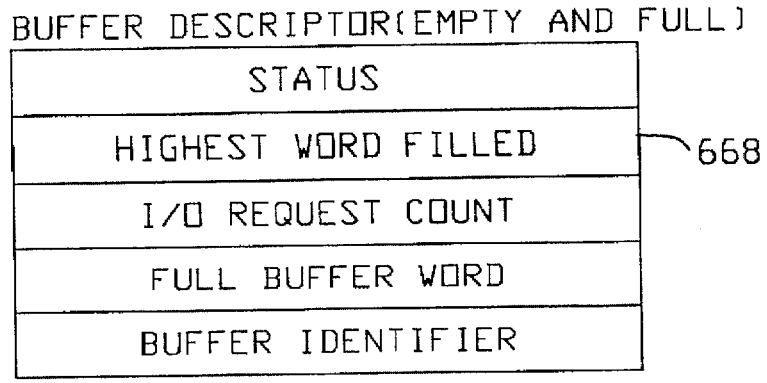
FIG. 13 illustrates the content of a Buffer Descriptor.

FIG. 13 illustrates the content of a Buffer Descriptor 668. The fields in a Buffer Descriptor are defined as follows:

Status—indicates whether the referenced Buffer is empty or full.

Highest Word Count—indicates the highest word address in the referenced Buffer that has been filled.

I/O Request Count—indicates the number of I/O requests that are currently in progress and are writing data which is being read from Disk into the Buffer.

Full Buffer Word—is the word offset address in the Buffer at which the Buffer is considered a Full Buffer 50.

Buffer Identifier—is a pointer to the particular Buffer referenced by the Buffer Descriptor.

Returning to FIG. 11, Step 670 obtains Disk address information based on the File Area Descriptors 654 contained in the Setup Call Packet 652. The purpose is to identify the devices on which the file is stored. Step 672 then creates a Disk I/O Management Table, a Disk-Channel-IOP Table, a Channel Management Table, and a IOP Management Table.

Figure 14:
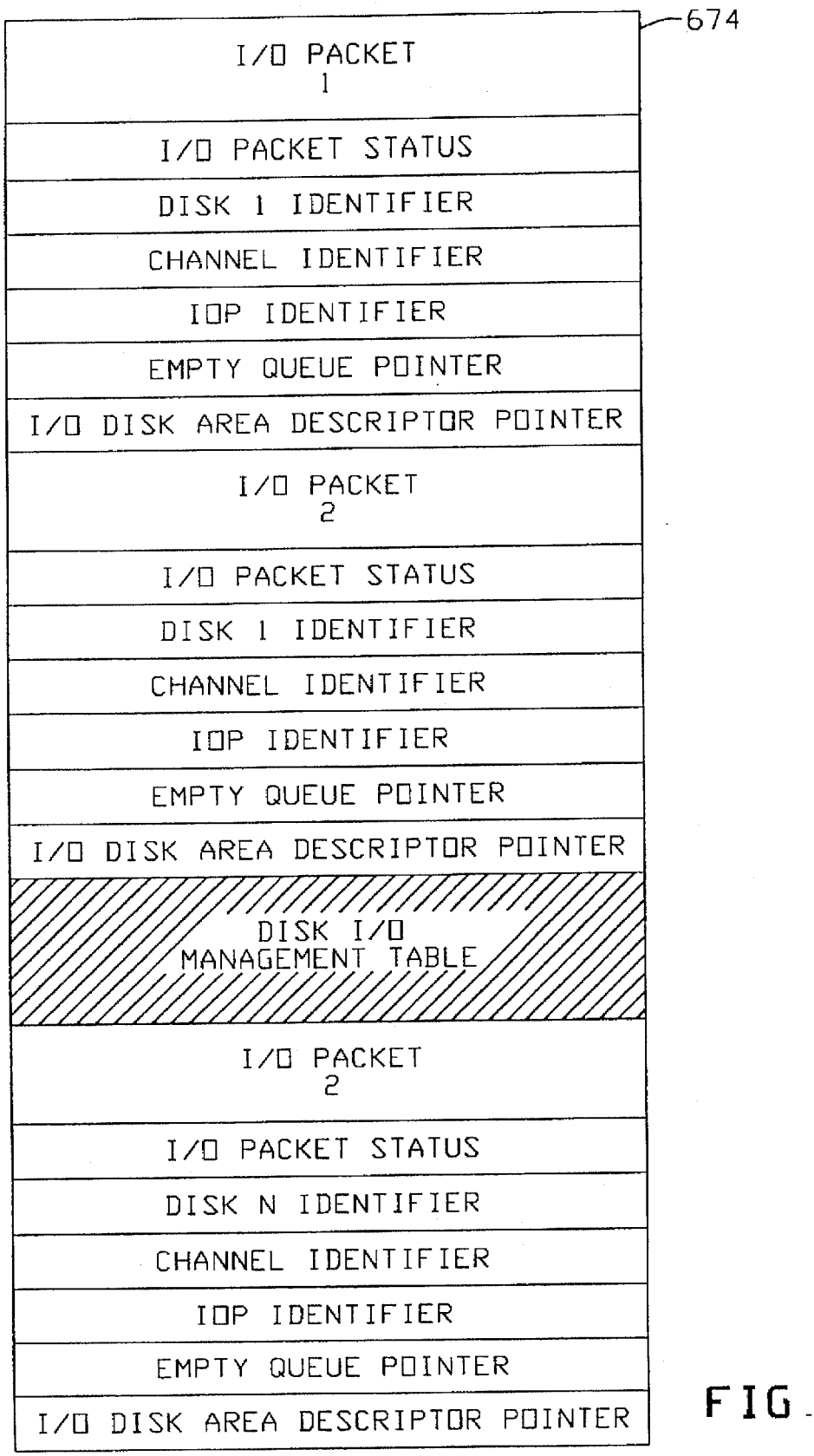
FIG. 14 illustrates the content of the Disk Management Table.

FIG. 14 illustrates the content of the Disk Management Table 674. The Disk I/O Management Table is used to control the number of I/O requests that are issued and incomplete for a particular Request. The Table contains two entries for each Disk 58, 60, and 62 on which the specified file is stored. Each entry contains the following fields:

I/O Packet—contains the information that is provided to the OS File I/O 240 for reading a portion of the specified file.

I/O Packet Status—indicates whether the I/O Packet is available or an I/O request is in-progress.

Disk Identifier—identifies the particular Disk to which the I/O request has been issued.

Channel Identifier—identifies the I/O Channel over which the I/O request is expected to be issued.

IOP Identifier—identifies the IOP through which the I/O request is expected to be issued.

Empty Queue Pointer—points to an Empty Buffer Descriptor in the Empty Queue 664.

I/O Disk Area Descriptor Pointer—points to an I/O Disk Area Descriptor (which is described in FIG. 19).

FIG. 15 illustrates the content of the Disk-Channel-IOP Table. The Disk-Channel-IOP Table is used to determine the possible I/O Channels 16, 18, and 20 through which a Disk is accessible. The Disk Identifier column identifies the different Disks 58, 60 and 62 on which the requested file is stored. There may be more than one entry for a single Disk if it is accessible via multiple Channel Adapters 164, 174, or 176. For each entry in the Disk Identifier column, there is at least one corresponding entry in the Channel Identifier column that identifies the Channel Adapter providing access to the Disk. For each Channel Identifier there is one IOP Identifier that identifies the IOP 158 or 160 to which the Channel Adapter is coupled. For example, Disk 192 of FIG. 4 would have two entries in the Table as follows (the reference numerals are used as the identifiers):

| Disk Identifier | Channel Identifier | IOP Identifier |
| --- | --- | --- |
| 192 | 164 | 158 |
| 192 | 174 | 160 |

FIG. 16 illustrates the content of the Channel Management Table. The Channel Management Table 678 is used to control the number of outstanding I/O requests over a particular Channel 16, 18, or 20 for a particular Request. The Table has a row for each Channel Adapter. Each row contains the Channel Identifier that uniquely identifies the Channel Adapter 164, 174, and 176 that provides access to the Disks 58, 60, and 62 on which the file is stored, a Maximum I/O Requests field that is preset according to the I/O capacity of the particular Channel, and an I/O Request Count field for the number of I/O requests presently issued and incomplete (with respect to the Parallel File Read) for the associated Channel Identifier.

FIG. 17 illustrates the content of the IOP Management Table. The IOP Management Table 680 is used to control the number of outstanding I/O requests in process by a particular IOP 158 and 160 for a physical read Request. The Table has a row for each IOP. Each row contains the IOP Identifier that uniquely identifies the IOP that provides access to the Disks 58, 60, and 62 on which the file is stored, a Maximum I/O Requests field that is preset according to the I/O capacity of the IOP, and an I/O Request Count field for the number of I/O requests presently issued and incomplete (with respect to the Parallel File Read request) for the associated IOP.

Figure 18:
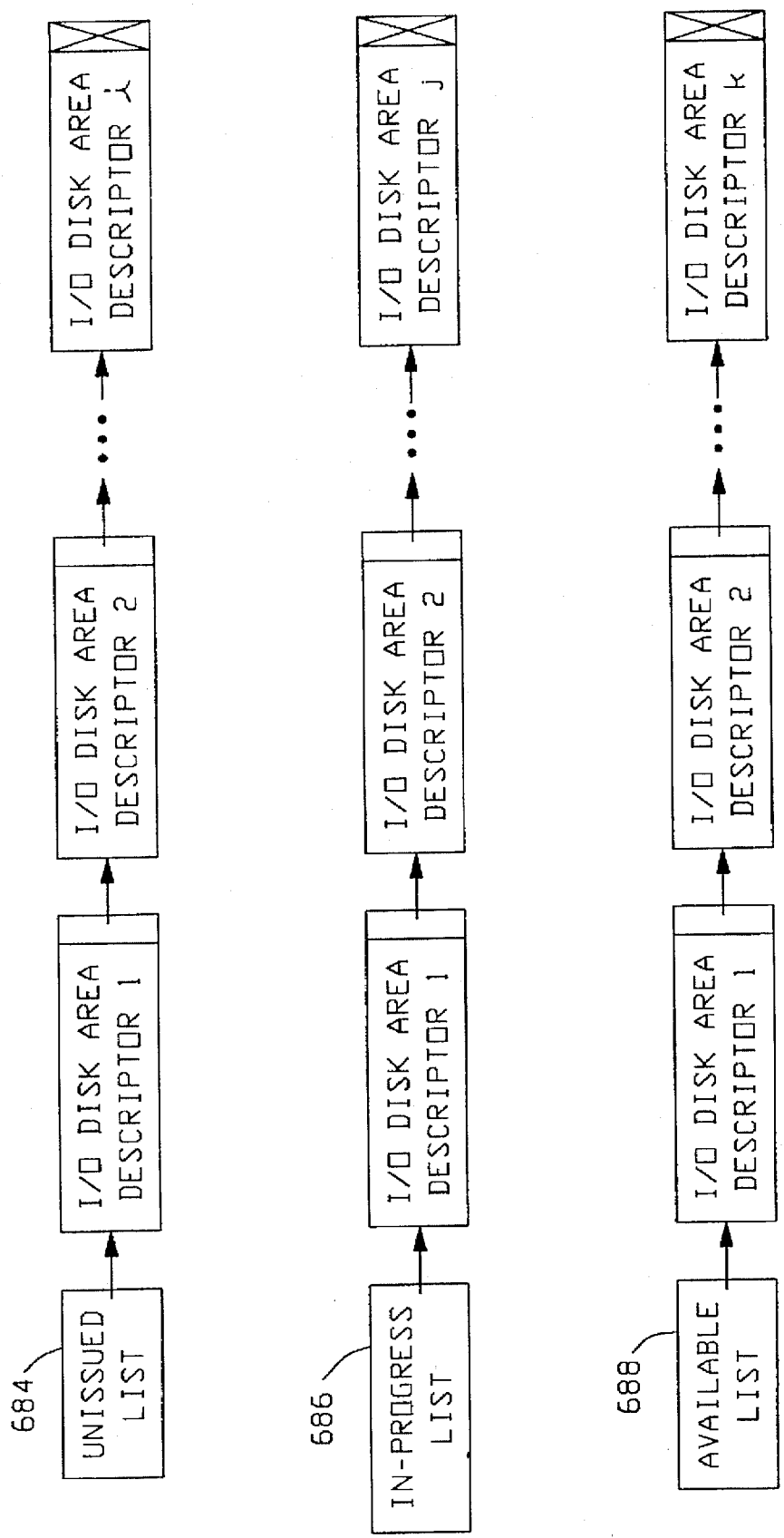
FIG. 18 illustrates the Unissued I/O Disk Area Descriptor list, the In-progress I/O Disk Area Descriptor list, and the Available I/O Disk Area Descriptor list.

Returning to Step 682 of FIG. 1, three lists of I/O Disk Area Descriptors are created to manage issuing I/O requests. FIG. 18 illustrates the three lists: the Unissued I/O Disk Area Descriptor list (Unissued list 684), the In-progress I/O Disk Area Descriptor list (In-progress list 686), and the Available I/O Disk Area Descriptor list (Available list 688). During Setup Processing, the Unissued list contains all the requests specified in the File Area Descriptors 654 from the Setup Call Packet 652. In reading the file, I/O Disk Area Descriptors move from the Unissued list to the In-progress list to the Available list. Entries on the Available list are used for creating new I/O Disk Area Descriptors on the Unissued list. The In-progress list contains I/O Disk Area Descriptor corresponding to I/O requests that have been issued and are 'incomplete.

FIG. 19 illustrates the content of an I/O Disk Area Descriptor. The fields in an I/O Disk Area Descriptor 690 are defined as follows:

Disk Identifier—identifies the particular Disk 58, 60, or 62 to which the I/O request is to be (or has been) issued.

Disk Relative Word Address—identifies the word address relative to the first addressable word on the Disk at which the area begins.

File Relative Word Address—identifies the word address relative to the first logically addressable word of the file at which the area begins.

Disk Area Length—is the length in words of the area to read.

I/O Packet Pointer—is a pointer to the I/O Packet in the Disk I/O Management Table 674.

Next I/O Disk Area Descriptor Pointer—is a pointer to the next I/O Disk Area Descriptor 684.

Combined Pointer—is a pointer to an I/O Disk Area Descriptor that will be combined into one I/O request.

The Unissued list 684 is then sorted by Disk Identifier and by Disk relative address. Step 692 initializes the In-progress list 686 to null.

At Step 694, an independent Reader Activity 284 is started to begin issuing I/O requests. A Request Identifier is assigned and returned to the caller at Step 696. The Request Identifier is then used on subsequent Buffer Exchange requests initiated by the caller. Step 698 determines the number of parallel I/O requests that may be issued and returns this value to the caller. The number of parallel I/O requests is equal to twice the number of Disks on which the file is stored. The number of parallel I/O requests per Disk may be adjusted upward or downward according to the performance capabilities of a particular Disk.

Figure 20:
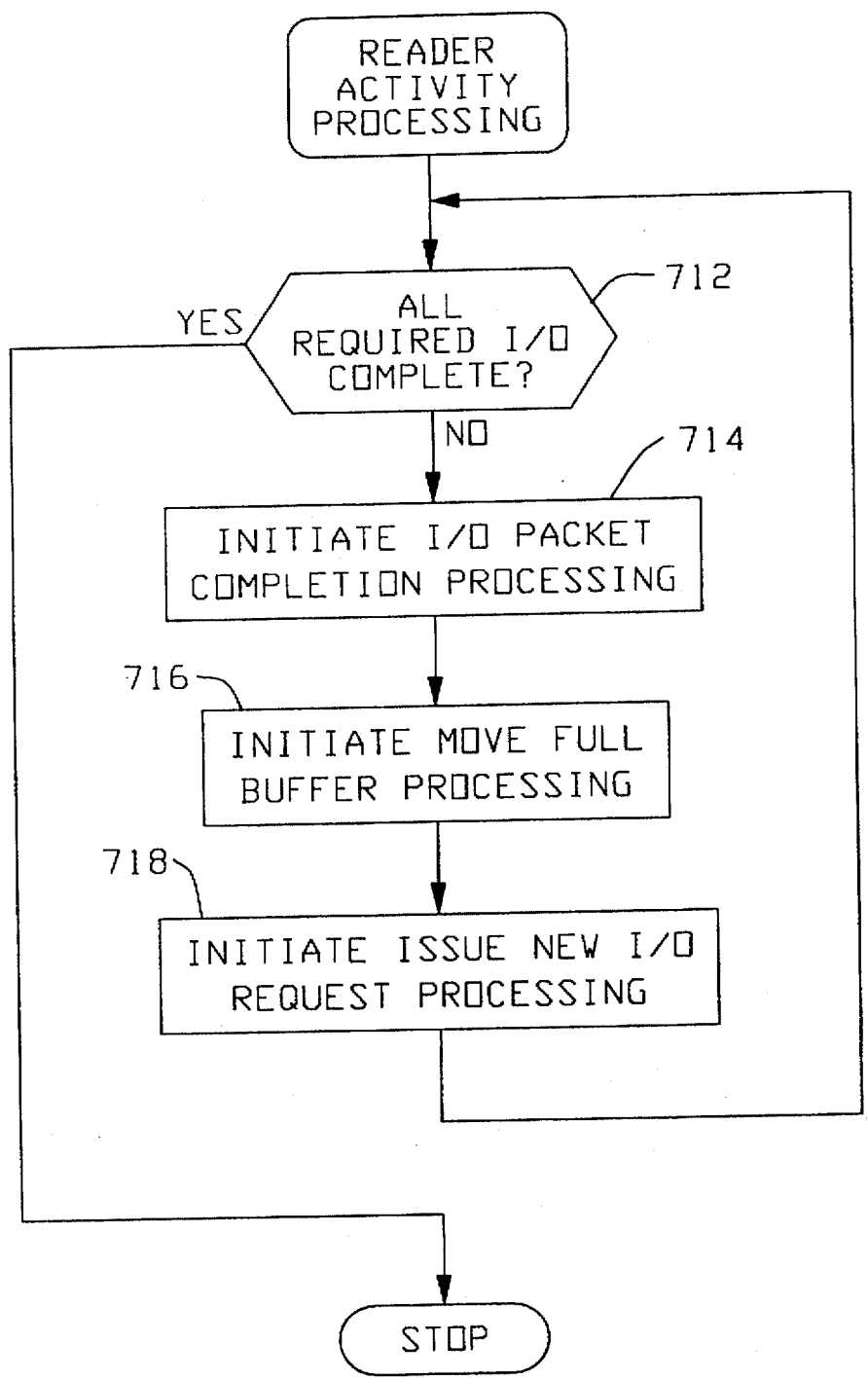
FIG. 20 is a flowchart of the Reader Activity processing.

FIG. 20 is a flowchart of the Reader Activity processing. The Reader Activity 284 completes processing of I/O requests, moves Buffers to the Full Queue 666, and issues I/O requests from the Unissued list 684 of I/O Disk Area Descriptors. Decision Step 712 tests whether there are any I/O requests remaining to be issued or are in-progress. If all the I/O requests have not completed, control is directed to Step 714 where I/O Packet Completion Processing is initiated. I/O Packet Completion processing manipulates the In-progress list 686 and Disk Management Table 674 as necessary.

Step 716 initiates Move Full Buffer Processing to move any Buffers on the Empty Queue 664 that have been filled with data to the Full Queue 666. The last Step 718 in the Reader Activity processing loop is to initiate Issue New I/O Request Processing. Issue New I/O Request Processing selects one or more I/O Disk Area Descriptors 690 from the Unissued list 684 and issues an I/O request.

Figure 21:
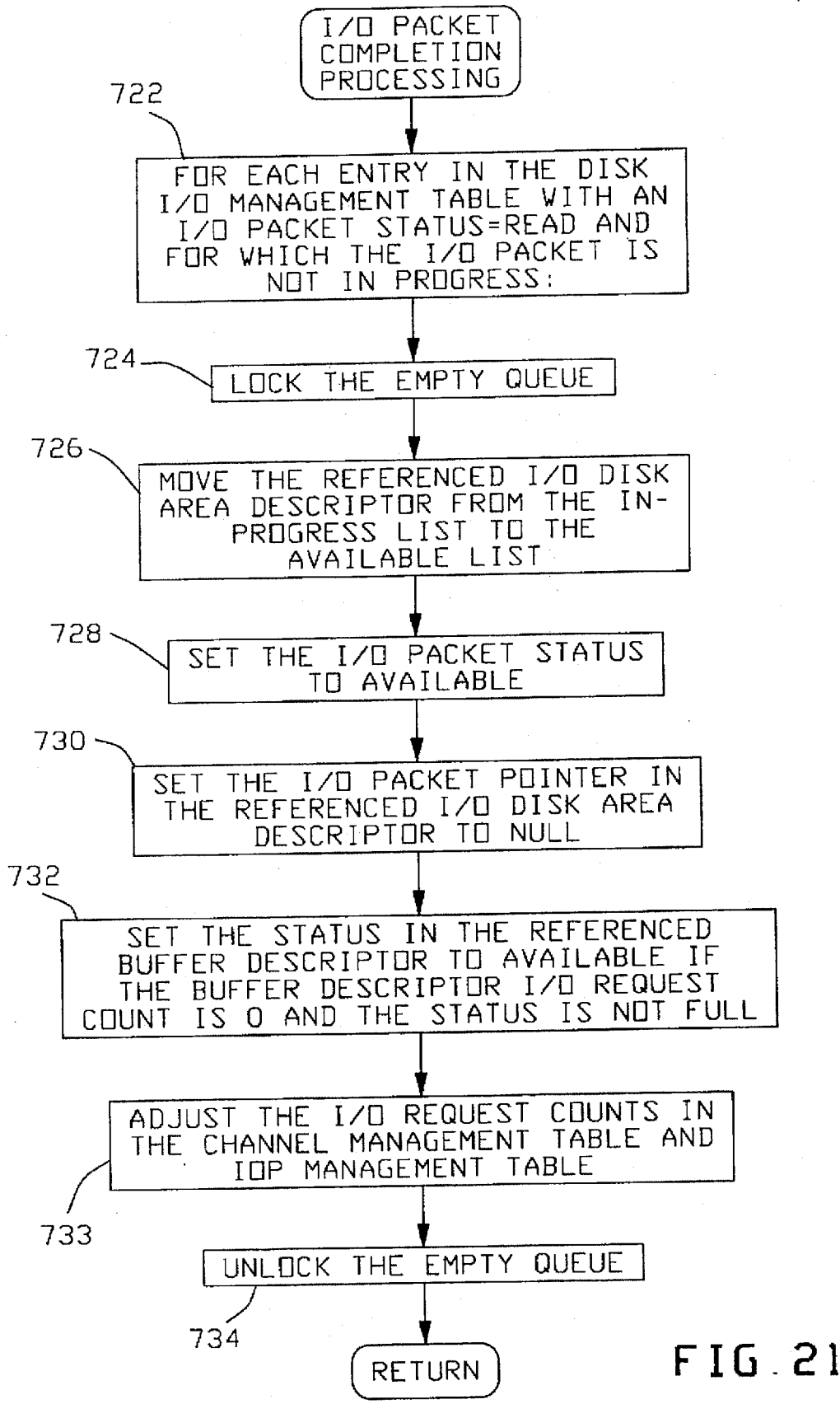
FIG. 21 is a flowchart of the I/O Packet Completion Processing.

FIG. 21 is a flowchart of the I/O Packet Completion Processing. I/O Packet Completion Processing checks the Disk I/O Management Table 674 for completed I/O Packets and processes them accordingly. At Step 722, the Disk I/O Management Table is checked for I/O Packets with a Status of Read and which are not In-progress. For each I/O Packet found, Steps 724–734 are performed.

Step 724 locks the Empty Queue 664 to prevent manipulation of the Empty Queue by the Buffer Exchange Processing (described in subsequent FIGs.) while the completed I/O request is processed. The I/O Disk Area Descriptor 690 on the In-progress list 686 that is referenced by the I/O Disk Area Descriptor Pointer from the entry in the Disk I/O Management Table 674 is moved to the Available list 688 at Step 726. Step 728 sets the I/O Packet Status to Available in the Disk I/O Management Table and Step 730 sets the I/O Disk Area Descriptor Pointer to null.

Step 732 adjusts the Status of the Buffer Descriptor 668 that is referenced by the Empty Queue Pointer in the Disk I/O Management Table 674 if all I/O requests that are writing to the Empty Buffer 52 have completed. If the I/O Request Count in the Buffer Descriptor is 0 and the Status is not Full, the Status in the Buffer Descriptor is set to Available so that additional I/O request may be issued to write to the Empty Buffer. Step 733 decrements the I/O Request Counts in the Channel Management Table 678 and in the IOP Management Table 680 for the Channel Identifier and IOP Identifier associated with the completed request. Step 734 unlocks the Empty Queue 664. After all completed I/O Packets have been processed, control is returned to the Reader Activity Processing.

Figure 22:
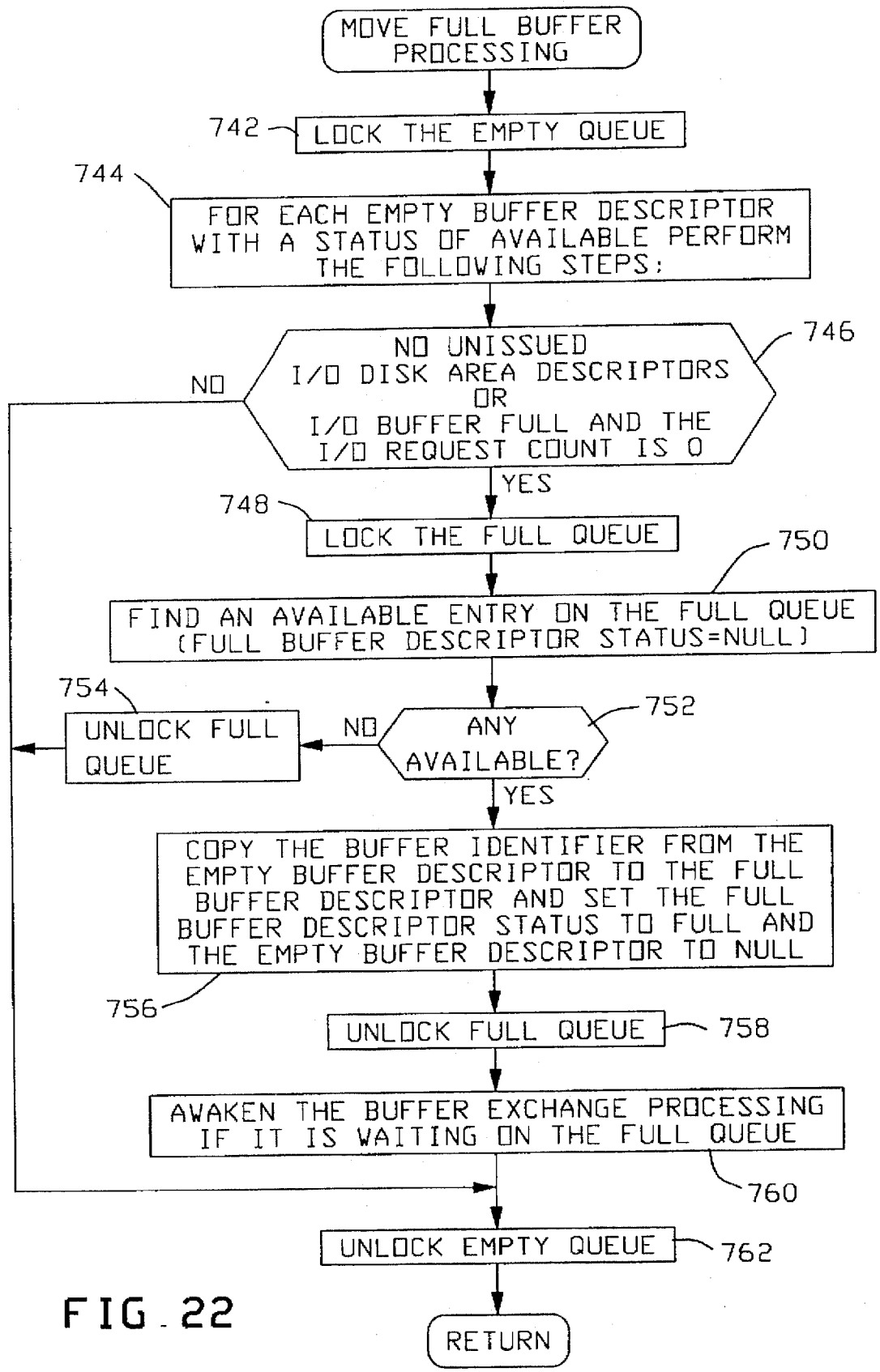
FIG. 22 is a flowchart of the Move Full I/O Buffer Processing that moves I/O Buffers from the Empty Queue to the Full Queue.

FIG. 22 is a flowchart of the Move Full Buffer Processing that moves Buffers from the Empty Queue 664 to the Full Queue 666. If the Buffer Exchange Processing (described in subsequent FIGs.) is waiting for a Full Buffer 50, it is awakened.

Step 742 locks the Empty Queue 664, and Step 744 checks each Buffer Descriptor 668 in the Empty Queue for a Status not equal to Null. For each Buffer Descriptor found, Steps 746–760 are performed. Decision Step 746 tests whether there are any remaining I/O Disk Area Descriptors 690 on the Unissued list 684 or In-progress list 686, or whether the Buffer on the Empty Queue is full and the I/O Request Count for the Buffer is 0. If either condition is satisfied, then the Buffer may be moved to the Full Queue 666 and control is directed to Step 748.

The Full Queue 666 is locked at Step 748 and Step 750 locates an available entry on the Full Queue. If the Status in a Buffer Descriptor 668 on the Full Queue is null, then the Buffer Descriptor is available. If no available entry was found on the Full Queue, decision Step 752 directs control to Step 754 where the Full Queue is unlocked.

If an available Buffer Descriptor 668 was found in the Full Queue 666, control is directed to Step 756 where the Buffer Identifier from the Buffer Descriptor on the Empty Queue is copied to the available entry in the Full Queue. The Status in the Buffer Descriptor on the Full Queue is set to Full and the Status of the Buffer Descriptor on the Empty Queue is set to Null.

Step 758 unlocks the Full Queue 666, and Step 760 awakens the Buffer Exchange Processing if it is waiting for more Full Buffers 50 to return to the Query Processor 10 for processing. Step 762 unlocks the Empty Queue 664 before control is returned to the Reader Activity Processing.

Figure 23B:
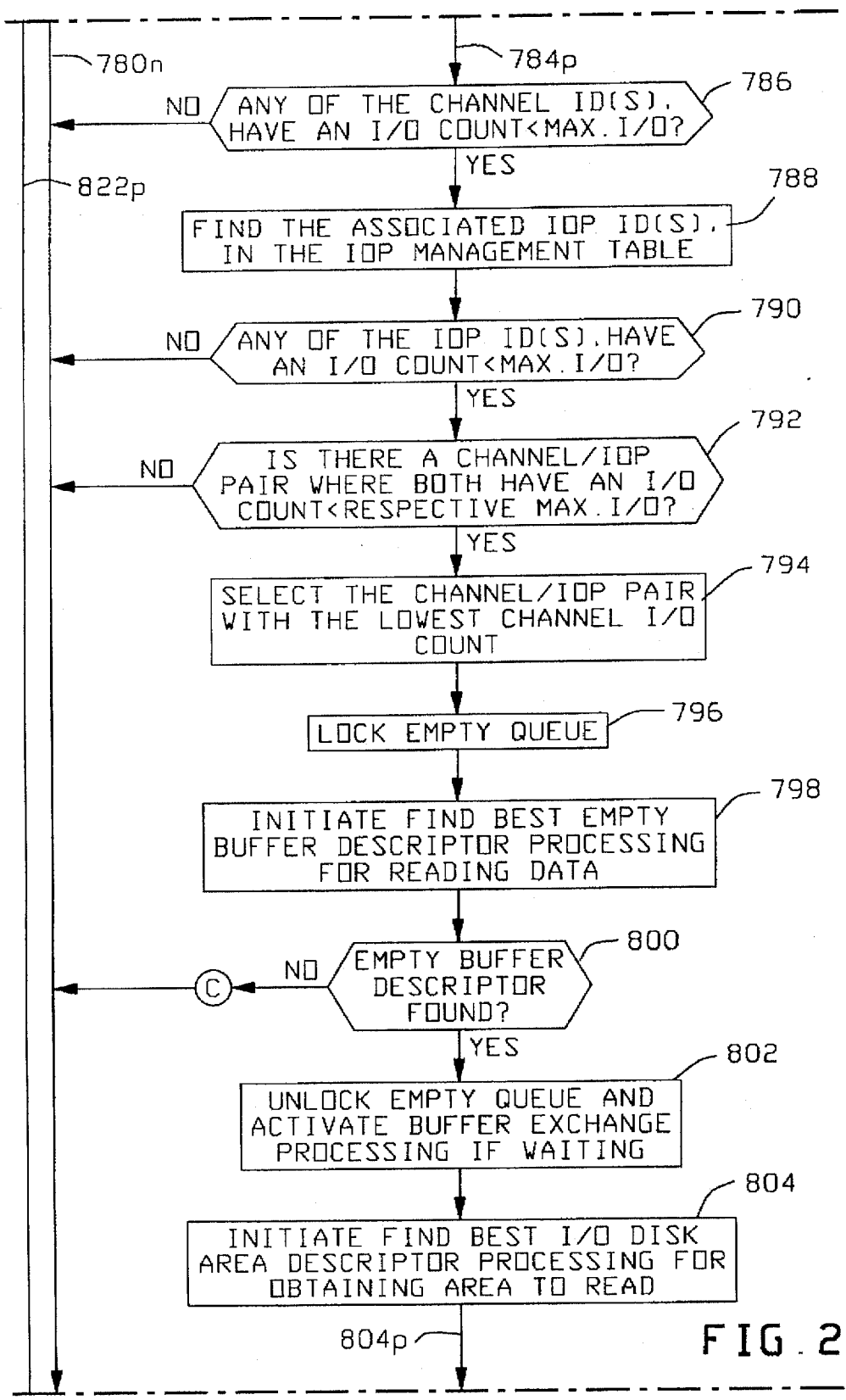
FIG. 23 shows the relationship of the flowchart of FIGS. 23A–D which contain a flowchart of the Issue New I/O Request Processing.
Figure 23C:
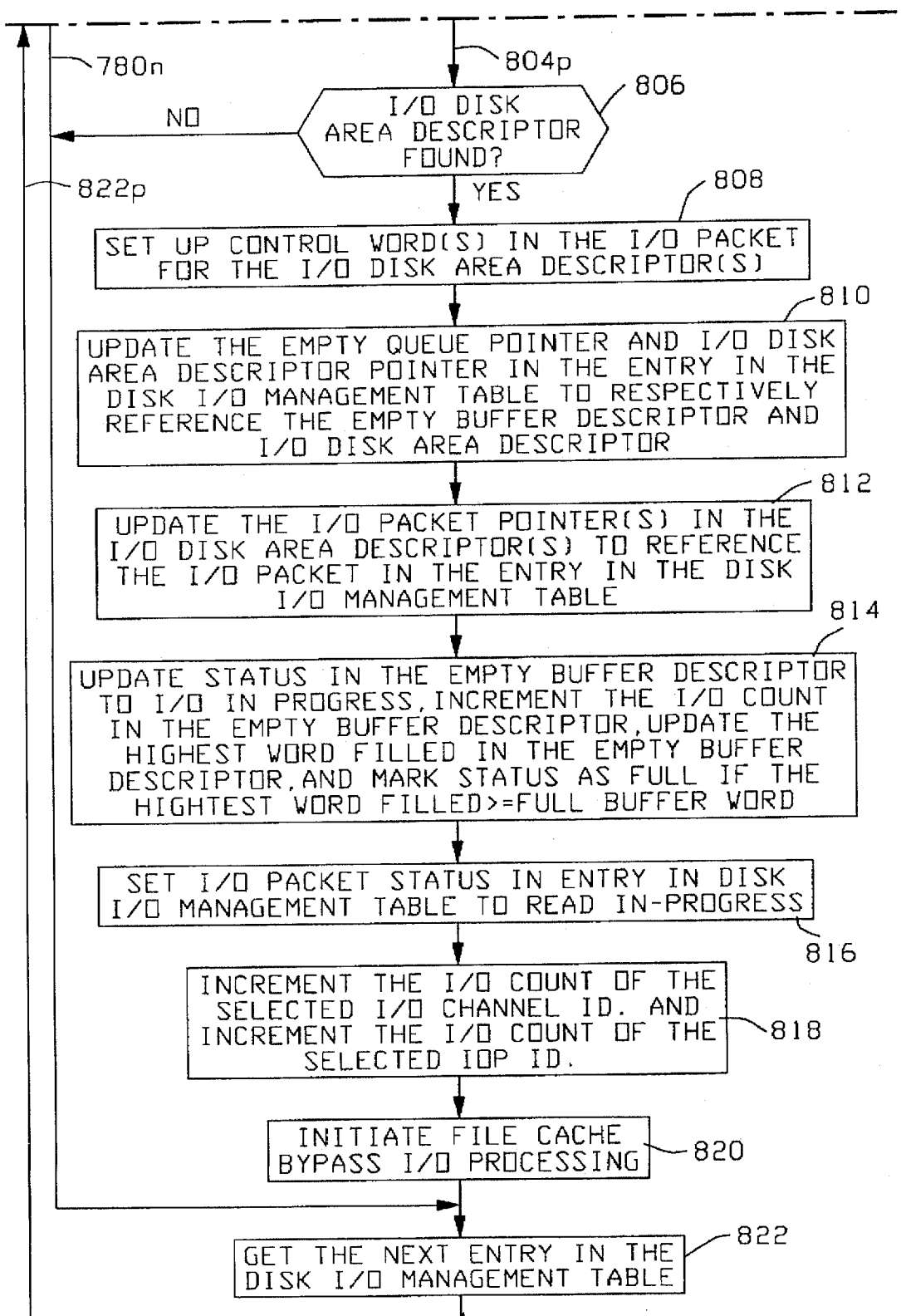
Figure 23D:
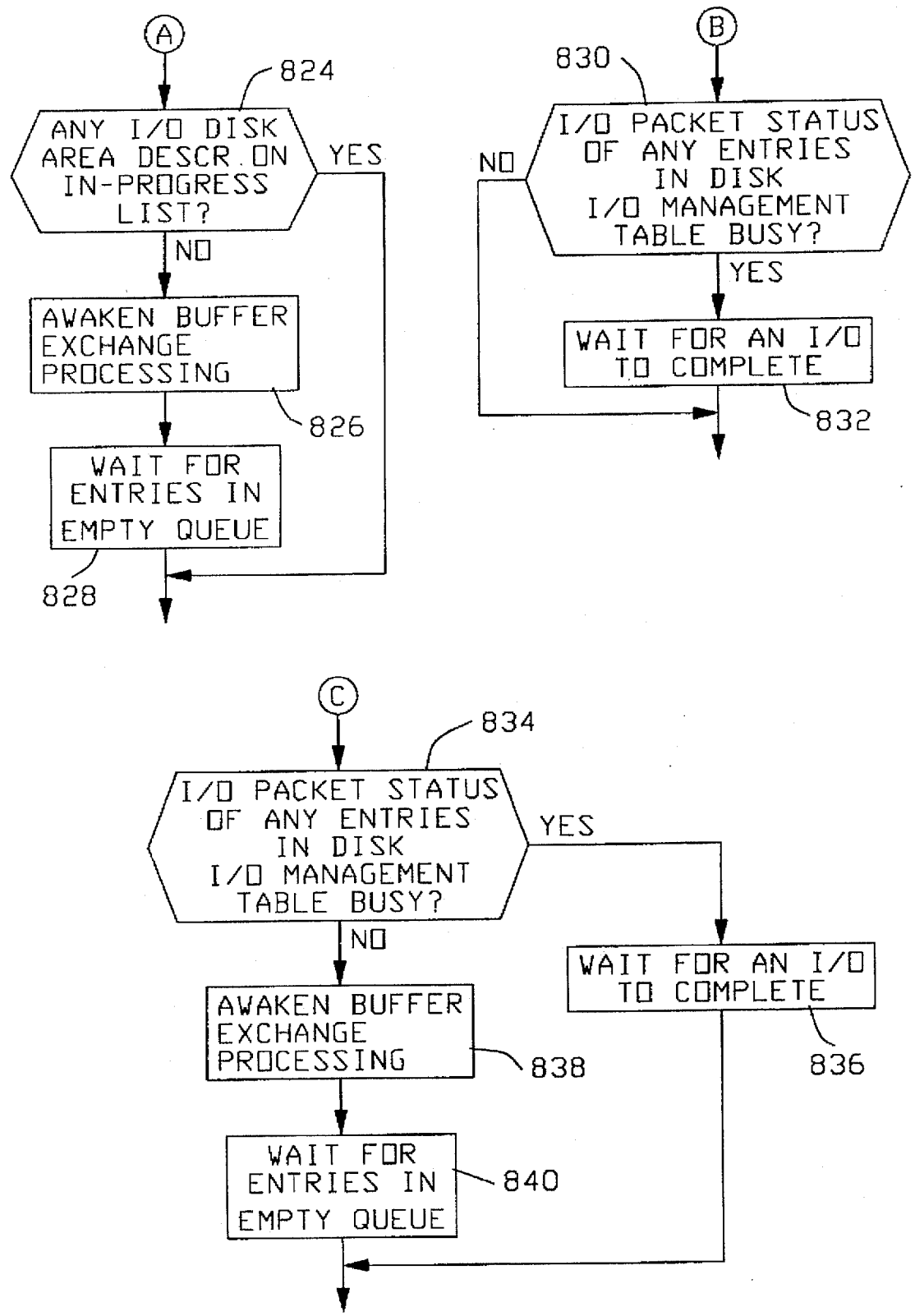

FIG. 23 shows the relationship of the flowchart of FIGS. 23A–D. FIGS. 23A–D contain a flowchart of the Issue New I/O Request Processing. Issue New I/O Request Processing issues new I/O requests from entries in the Unissued list 684 of I/O Disk Area Descriptors 690.

The initial processing done is to check for any I/O Disk Area Descriptors 690 on the Unissued list 684 and whether any I/O Packets in the Disk I/O Management Table 674 have a Status of Available as shown by decision Steps 772 and 774. If there are entries remaining on the Unissued list and there is an available I/O Packet in the Disk I/O Management Table, control is directed to Step 776 to determine whether an I/O Packet is available for an entry on the Unissued list.

Step 776 obtains the first entry in the Disk I/O Management Table 674 and decision Step 778 tests whether the end of the Table has been reached. If the end of the Table has been reached, control is returned. Decision Step 780 tests whether the I/O Packet Status of the present entry in the Disk I/O Management Table is Available. If so, control is directed to Step 782. Otherwise, control is directed to Step 822.

Steps 782 through 792 determine whether an I/O request should be issued for the Disk identified by the Disk Identifier in the Disk I/O Management Table 674 based on the Channels 16, 18, and 20 of the in-progress I/O requests for the query. The objective is to not overload the IOPs 158 and 160, Channel Adapters 164, 174, and 176, and Disks with I/O requests for a single query.

Step 782 obtains the Channel Identifiers and IOP Identifiers that are associated with the Disk Identifier from the Disk-Channel-IOP Management Table 676. Step 784 then finds the Channel Identifier(s) in the Channel Management Table to determine the present load that the query is placing on the Channel Adapter(s). If there is a Channel Identifier that has an I/O Count that is less than the Maximum I/O Count, decision Step 786 directs control to Step 788. Otherwise, control is directed to Step 822.

Step 788 finds the IOP Identifier(s) in the IOP Management Table 680 to determine the present load that the query is placing on the IOPs Decision Step 790 evaluates the load on the IOPs by examining the IOP Management Table. If the I/O Count or any of the IOP Identifiers is less than the Maximum I/O Count, control is directed to decision Step 792. Otherwise, control is directed to Step 822.

Decision Step 792 checks whether there is an IOP Identifier/Channel Identifier pair which both have their respective I/O Counts less than their Maximum I/O Counts. If so, control is directed to Step 794. Otherwise, control is directed to Step 780. Step 794 selects the IOP Identifier/Channel Identifier pair with the lowest I/O Count from the Channel Management Table 678, if there is more than one pair available. Step 796 locks the Empty Queue 664, and Step 798 initiates Find Best Empty Buffer Descriptor Processing.

The Find Best Empty Buffer Descriptor Processing returns an Empty Buffer Descriptor 668 that references the Empty Buffer 52 with the most available space. If an Empty Buffer Descriptor was found, decision Step 800 directs control to Step 802 where the Empty Queue is unlocked and the Buffer Exchange Processing is awakened if it is waiting to lock the Empty Queue. Step 804 initiates Find Best I/O Disk Area Descriptor Processing to obtain an area to read from the Disk 58, 60, or 62. If an I/O Disk Area Descriptor is returned, decision Step 806 directs control to Step 808. Otherwise, control is directed to Step 780.

Step 808 sets up one or more control words in the I/O Packet in the Disk I/O Management Table 674 based on the one or more I/O Disk Area Descriptors returned from the Find Best I/O Disk Area Descriptor Processing. The control words in the I/O Packet indicate the area(s) on the Disk to be read and whether any data should be skipped. If only a small space separates areas specified by I/O Disk Area Descriptors, the I/O Disk Area Descriptors are combined into one I/O request contained in the I/O Packet because it is more efficient to issue a single I/O request rather than multiple I/O requests in this case.

Step 810 updates the Empty Queue Pointer and I/O Disk Area Descriptor Pointer in the entry in the Disk I/O Management Table 674. The Empty Queue Pointer is set to reference the Empty Buffer Descriptor from Step 798 and the I/O Disk Area Descriptor Pointer is set to reference the I/O Disk Area Descriptor from Step 804. Step 812 updates the I/O Packet Pointer(s) in the I/O Disk Area Descriptor(s) to reference the I/O Packet in the entry in the Disk I/O Management Table.

Step 814 updates various fields in the Empty Buffer Descriptor from Step 798. The Status is set to I/O In-progress, the I/O Count is incremented, and the Highest Word Filled is adjusted to account for the data that will be read as a result of the I/O request. If the adjusted Highest Word Filled is greater than or equal to the Full Buffer Word, then the Status is set to Full. The I/O Packet Status in the entry in the Disk I/O Management Table 674 is set to Read In-progress at Step 816.

Step 818 adjusts the I/O Counts for the IOP Identifier and Channel Identifier in the Channel Management Table 678 and IOP Management Table 680. In addition, the Channel Identifier and IOP Identifier are stored in the appropriate entry in the Disk I/O Management Table. The I/O request is issued by initiating File Cache Bypass Processing at Step 820. File Cache Bypass Processing issues the I/O request to the designated Disk 58, 60, or 62 and merges the data with corresponding data that is present in the Nonvolatile File Cache 102 and has been updated. The I/O request is issued asynchronously to the processing of the Reader Activity 284. Thus, control is returned to Issue New I/O Request Processing before the File Cache Bypass Processing is completed. Step 822 obtains the next entry in the Disk I/O Management Table 674 and control is returned to Step 778.

Returning to Step 772, if it is found that there are no entries on the Unissued list 684, control is directed to decision Step 824 of FIG. 23D. Note that the circle labeled A designates the initiation of the processing Steps referenced by another labeled circle A in FIG. 23D. When the processing steps that are referenced by a labeled circle are complete, control is presumed to be returned to the control line emanating from the labeled circle. If there are I/O requests in progress, that is, there are entries on the In-progress List 686, control is returned to the Reader Activity Processing. Otherwise, Step 826 awakens the Buffer Exchange Processing to process any Full Buffers 50. Step 828 suspends the Reader Activity Processing to wait for entries in the Empty Queue 664. This processing is resumed upon being activated by the Buffer Exchange Processing.

If Step 774 finds that there are not any available I/O Packets in the Disk I/O Management Table 674, control is directed to Step 830 in FIG. 23D. Decision Step 830 tests whether the I/O Packet Status of any of the I/O Packets is Busy. If so, Step 832 suspends processing until one of the I/O requests completes. Control is then returned to the Read Activity Processing. If none of the I/O Packets has a Busy Status, then Step 832 is skipped.

Moving to Step 800, if no Empty Buffer Descriptor 668 was found, control is directed to Step 834 of FIG. 23D. Decision Step 834 tests whether any of the I/O Packets in the Disk I/O Management Table 674 are busy. If so, Step 836 suspends processing until one of the I/O requests completes. Otherwise, control is directed to Step 838 where the Buffer Exchange Processing is resumed if it is waiting for Full Buffers 50. Step 840 then suspends processing to wait for entries in the Empty Queue 664. This processing is resumed upon being activated by the Buffer Exchange Processing.

Figure 24:
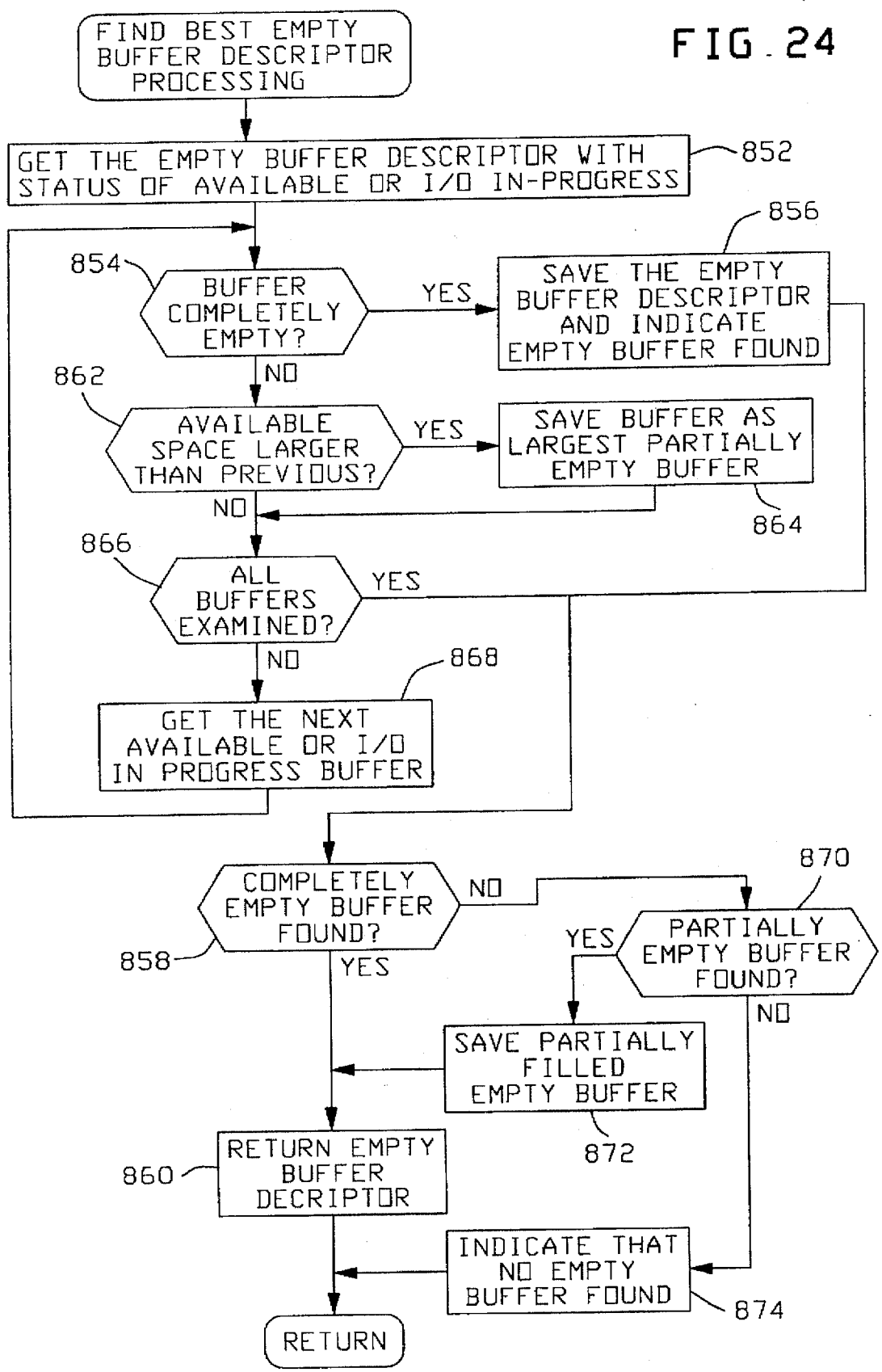
FIG. 24 is a flowchart of the Find Best Empty Buffer Descriptor Processing.

FIG. 24 is a flowchart of the Find Best Empty Buffer Descriptor Processing which obtains the Empty Buffer 52 that has the most space available and has a Status of Available or I/O in progress. Step 852 obtains the first Empty Buffer Descriptor that has a status of Available or I/O in-progress. Decision Step then tests whether the Buffer is completely empty. If so, control is directed to Step 856 where the Empty Buffer Descriptor is saved and it is indicated that an Empty Buffer was located. Control is then directed to decision Step 858 to determine whether a completely empty Buffer was found. Because control was directed to Step 858 from Step 858, the test will pass and control is directed to Step 860 where the Empty Buffer Descriptor is returned. In the case of the completely empty Buffer, the associated Empty Buffer Descriptor is returned.

If decision Step 854 finds that the present Buffer is not a completely empty Buffer, control is directed to Step 862.

Decision Step 862 tests whether the Empty Buffer under consideration has more space available than a previously saved Empty Buffer. If so, control is directed to Step 864 where the Empty Buffer under consideration is saved as the largest partially empty Buffer. Otherwise, control is directed to decision Step 866 to determine whether all the Buffers have been examined. If there are more Empty Buffer Descriptors to process, control is directed to Step 868 where the next Empty Buffer Descriptor having a Status of I/O in-progress or Available is obtained. Control is then returned to decision Step 854.

Once Step 866 finds that all the Buffers have been processed, or a completely empty Buffer is found at Step 854, control is directed to Step 858. If Step 858 finds that a completely empty Buffer was not found, control is directed to decision Step to determine whether a partially empty Empty Buffer was found. If a partially empty Empty Buffer was found, Step 872 saves the partially empty Buffer as the Empty Buffer Descriptor to return. Otherwise, Step 874 indicates that an Empty Buffer could not be found.

Figure 25A:
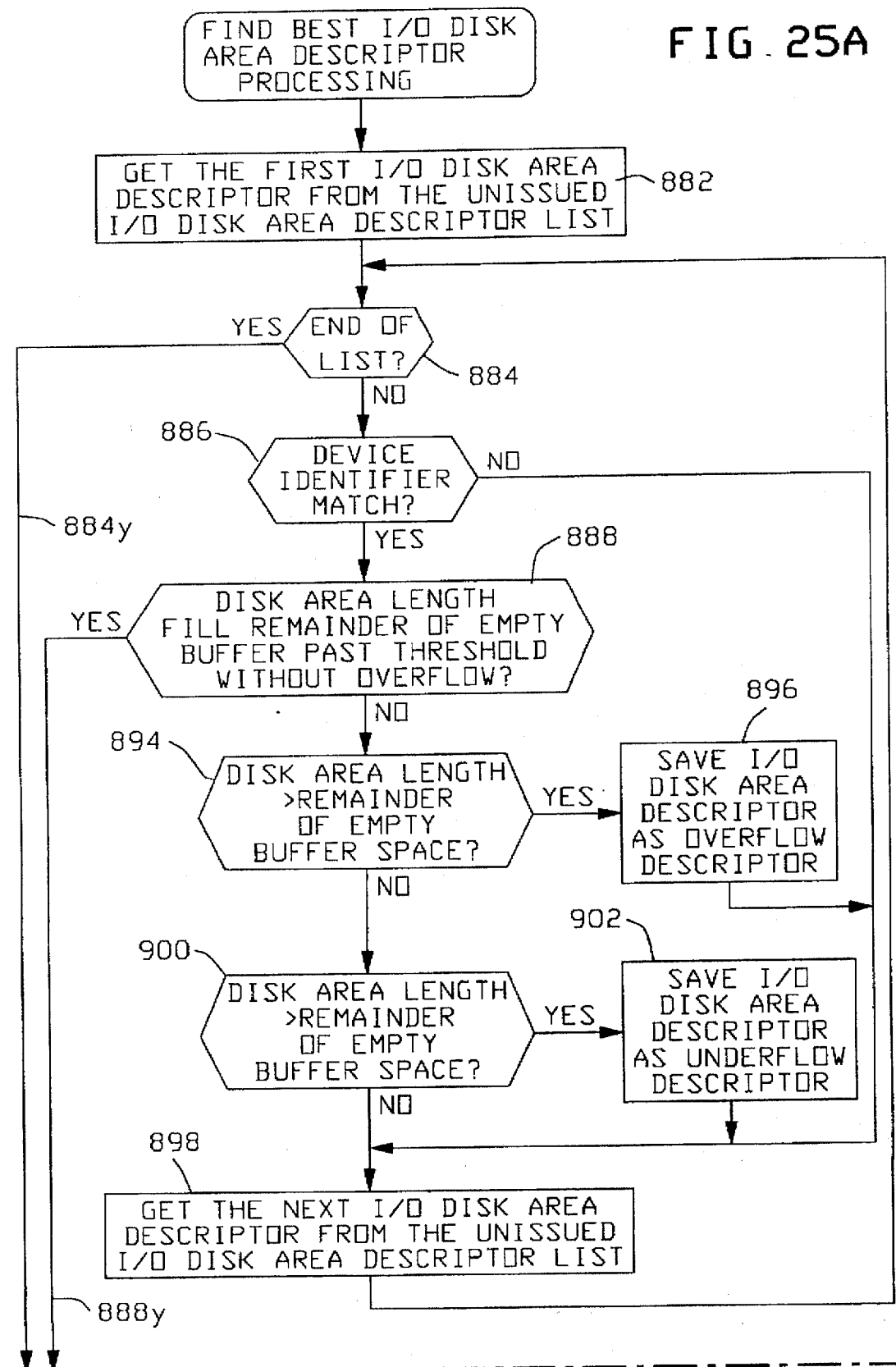
FIG. 25 shows the relationship of the flowchart of FIGS. 25A–C which contain a flowchart of the Find Best I/O Disk Area Descriptor Processing.
Figure 25C:
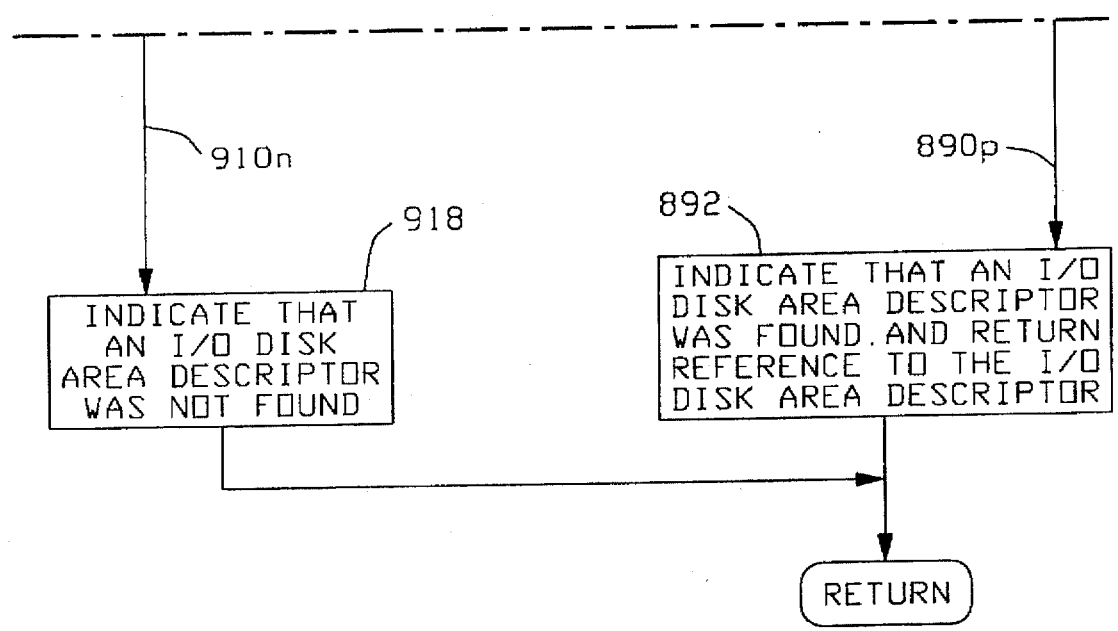

FIG. 25 shows the relationship of the flowchart of FIGS. 25A-C. FIGS. 25A-C contain a flowchart of the Find Best I/O Disk Area Descriptor Processing. This processing obtains one or more I/O Disk Area Descriptors from the Unissued list 684 and returns them to the Issue New I/O Request Processing.

Step 882 obtains the first I/O Disk Area Descriptor from the Unissued list 684. If the end of the list has not been reached, decision Step 884 directs control to decision Step 886. If the Disk Identifier in the I/O Disk Area Descriptor matches the Disk Identifier from the Disk I/O Management Table 674 entry, decision Step 886 directs control to decision Step 888. Decision Step 888 tests whether the amount of data requested in the I/O Disk Area Descriptor would fill the Empty Buffer 52 past the Full Buffer Word specified in the Buffer Descriptor 668 and not exceed the space available in the Buffer. Under ideal conditions, the amount of data would fill the Buffer and control is directed to Step 890. Step 890 moves the I/O Disk Area Descriptor from the Unissued list to the In-progress list 686. Processing then proceeds to Step 892 where it is indicated that an I/O Disk Area Descriptor was found and reference to the Descriptor is returned.

If either the data referenced by the I/O Disk Area Descriptor would not fill the Empty Buffer 52, decision Step 888 directs control to Step 894. Step 894 tests whether the amount of data referenced is too large. If so, control is directed to Step 896 where the Descriptor is saved as an Overflow Descriptor. Control is then directed to Step 898 to obtain the next I/O Disk Area Descriptor from the Unissued list 684.

Decision Step 894 directs control to decision Step 900 if the amount of data referenced is not too large for the Empty Buffer 52. If the amount of data referenced is less than the available space in the Empty Buffer, then control is directed to Step 902 where the Descriptor is saved as an Underflow Descriptor. Control is then directed to Step 898 to obtain the next I/O Disk Area Descriptor.

If decision Step 886 finds that the Disk Identifier does not match, control is directed to Step 898 to obtain the next I/O Disk Area Descriptor 690. Once the end of the Unissued list 684 has been reached, decision Step 884 directs control to decision Step 904.

If an Overflow Descriptor is available from Step 896, decision Step 904 directs control to Step 906. Step 906 initiates Split I/O Disk Area Descriptor Processing to divide Overflow Descriptor into two I/O Disk Area Descriptors 690. The I/O Disk Area Descriptor returned from the Split processing is moved to the In-progress list 686 at Step 908 and control is directed to Step 892 as described above.

Decision Step 904 directs control to Step 910 if an Overflow Descriptor was not found. If an Underflow Descriptor was saved at Step 902, control is directed to Step 912. Steps 912–916 move one or more Disk Area Descriptors 690 to the In-progress list 686 until a Descriptor is encountered that references data that is separated from the data referenced in the prior Descriptor by an amount that would not permit combining the Descriptors into one I/O request or the combination would not fit in the Empty Buffer 52. Step 912 links the I/O Disk Area Descriptor to the last linked or Underflow Descriptor. In-progress-list. If the end of the Unissued list 684 has been reached or the Disk Identifier in the next Descriptor is not equal to the Disk Identifier of the entry in the Disk I/O Management Table 674, control is directed to Step 892 as described above. Otherwise, the next Descriptor is examined at Step 916 to determine whether the referenced data is separated from the previously referenced data by less than a Combine Threshold and the data referenced by the combined Descriptors would fit in the Empty Buffer 52. The Combine Threshold is system dependent and is set to a value for which it would be more efficient to issue one input-output request that references two non-contiguous areas and discard the unneeded data than to issue two input-output requests. If the test at Step 916 passes, control is returned to Step 917 where the I/O Disk Area Descriptor is linked to the previously saved I/O Disk Area Descriptor (using the Combine Pointer in the I/O Disk Area Descriptor). Control is directed from Step 917 to Step 914. If the test at Step 916 fails, control is directed to Step 892.

If neither an Overflow nor an Underflow Descriptor was found, Step 918 indicates that an I/O Disk Area Descriptor was not found and control is returned to Issue New I/O Request Processing.

Figure 26:
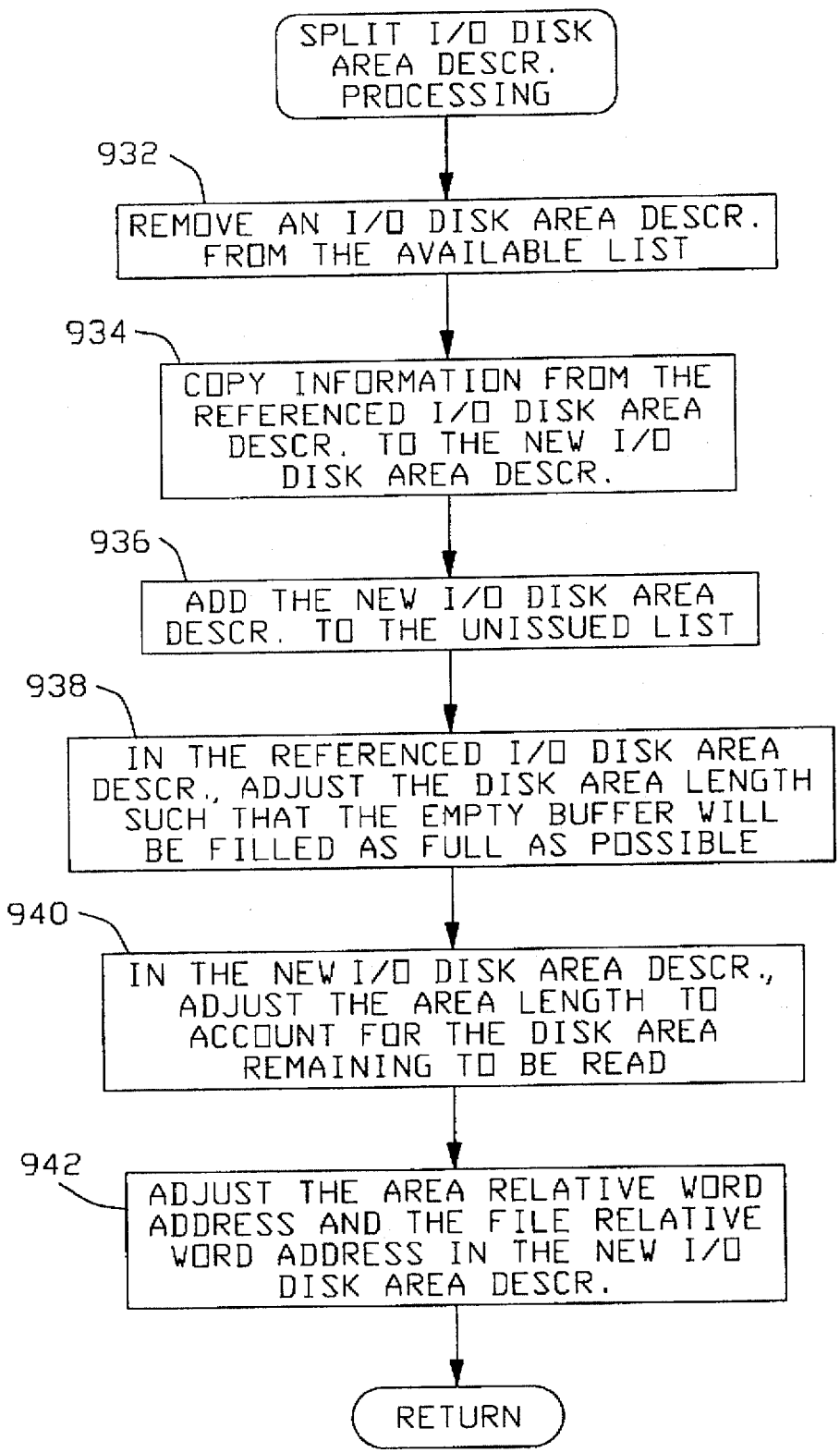
FIG. 26 is a flowchart of the processing for Split I/O Disk Area Descriptor Processing.

FIG. 26 is a flowchart of the processing for Split I/O Disk Area Descriptor Processing. Split I/O Disk Area Descriptor Processing divides an I/O Disk Area Descriptor 690 into two I/O Disk Area Descriptors. It is initiated when a Descriptor on the Unissued List 684 is encountered and the Descriptor references a quantity of data that will not fit into an Empty Buffer.

Step 932 removes an I/O Disk Area Descriptor 690 from the Available list 686. At Step 934, the information contained in the referenced Descriptor that is passed to the Split Processing is copied to the new Descriptor from Step 932. Step 936 adds the new Descriptor to the Unissued list In the referenced I/O Disk Area Descriptor, at Step 938 the Disk Area Length is adjusted such that the Empty Buffer 52 will be filled as full as possible upon completion of the I/O request that will be issued. At Step 940, the Disk Area Length in the new Descriptor is set to account for the quantity removed from the referenced Descriptor. Step 942 adjusts the Disk Relative Word Address and the File Relative Word Address in the new Descriptor accordingly.

Figure 27A:
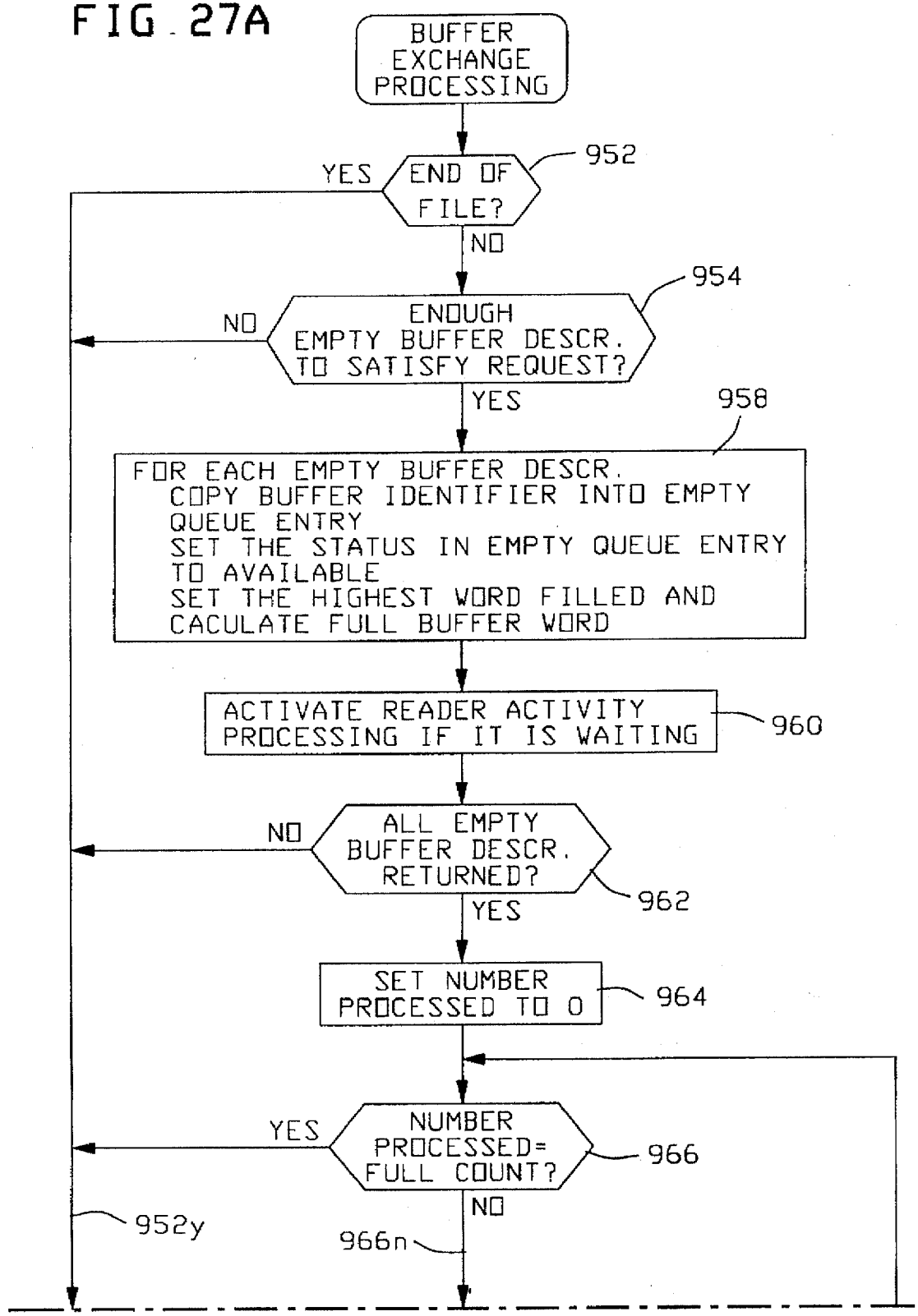
FIG. 27 shows the relationship of the flowchart of FIGS. 27A–B which contain a flowchart of the Buffer Exchange Processing.
Figure 27B:
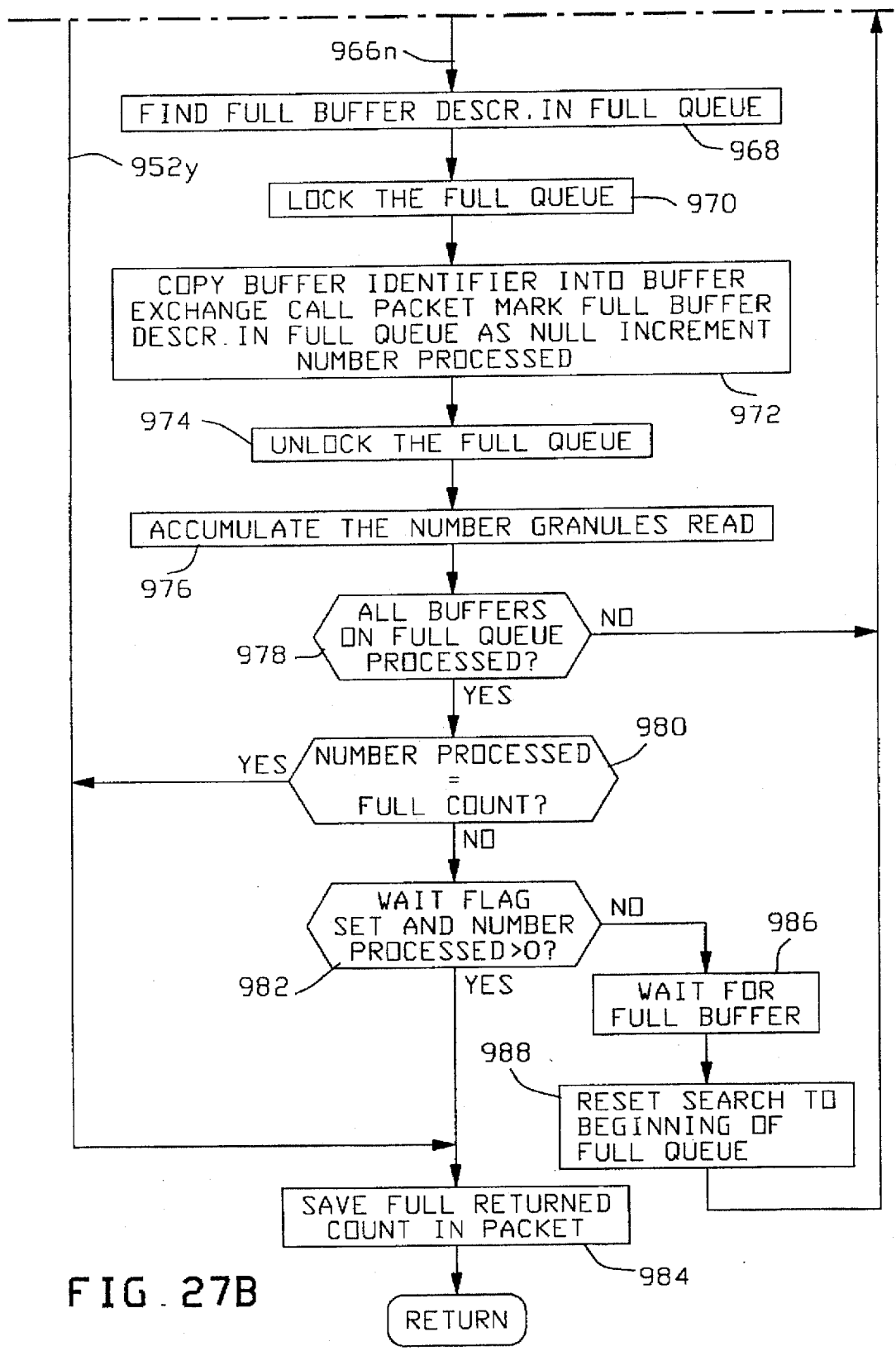

FIG. 27 shows the relationship of the flowchart of FIGS. 27A-B. FIGS. 27A-B contain a flowchart of the Buffer Exchange Processing. Buffer Exchange Processing is initiated by the File Processing Program 214 to exchange Buffers that it has completed searching (Empty Buffers 52) for Full Buffers 50 that the Reader Activity has filled.

If the end of the file has not been reached, decision Step 952 directs control to decision Step 954. Decision Step 954 tests whether enough Empty Buffer Descriptors 668 have been provided in the Buffer Exchange Call Packet.

Figure 28:
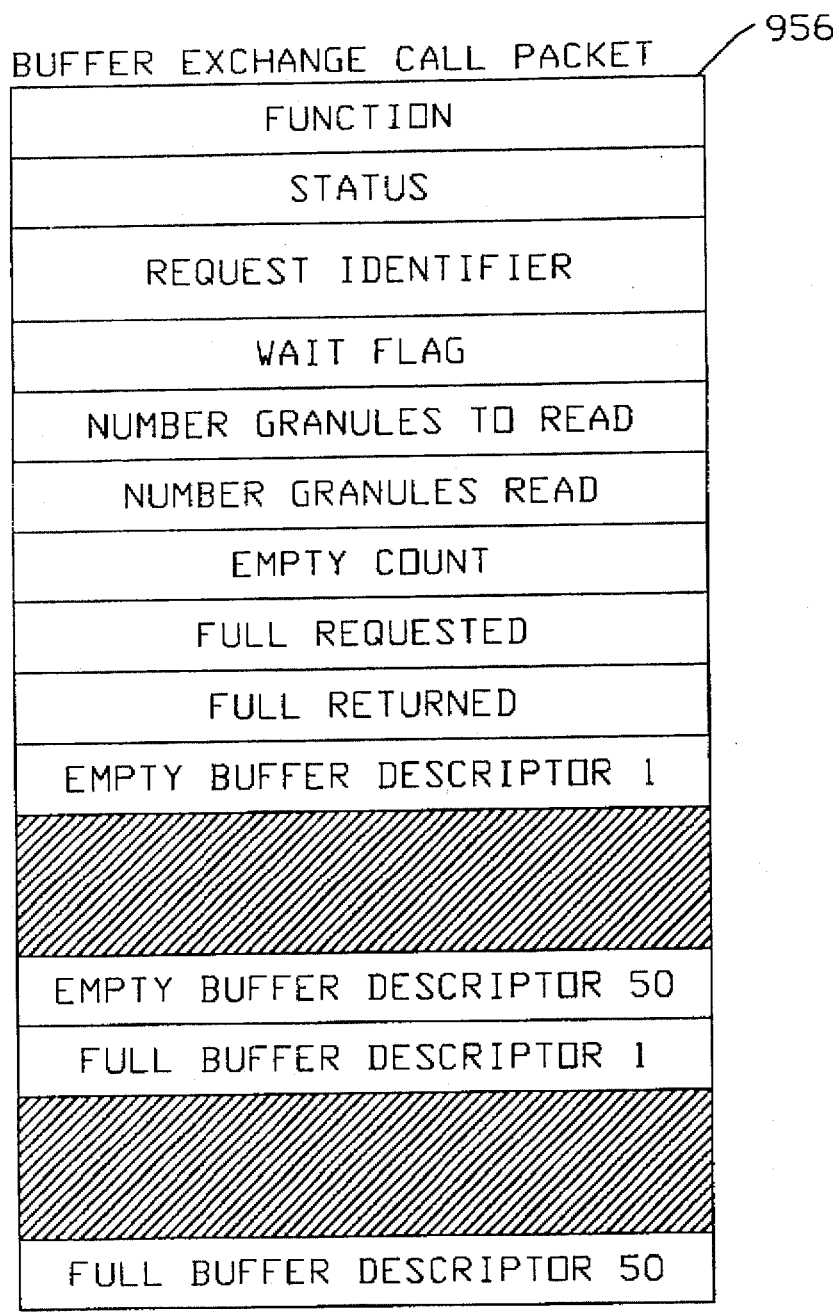
FIG. 28 shows the content of the Buffer Exchange Call Packet.

FIG. 28 shows the content of the Buffer Exchange Call Packet 956. The fields are defined as follows:

Function—a code that specifies the Buffer Exchange function.

Status—a code returned to indicate the status of the call.

Request Identifier—a code that is provided to identify the physical read Request.

Wait Flag—is set if the File Processing Program should be suspended only if there are not any Full Buffers 50 to return.

Number of Granules to Read—is set by Setup Processing to indicate the total number of granules that are to be read for the physical read Request.

Number of Granules Read—is set during Buffer Exchange Processing to indicate the total number of granules that have been returned in Full Buffers for the Request.

Empty Count—is the number of Empty Buffer Descriptors 668 that are contained in the Buffer Exchange Call Packet.

Full Requested—is the number of Full Buffer Descriptors that are requested to be returned by the File Processing Program.

Full Returned—is the number of Full Buffer Descriptors returned to the caller for processing.

Empty Buffer Descriptors 1–50—are the Buffer Descriptors that are being returned.

Full Buffer Descriptors 1–50—are updated by Buffer Exchange Processing to reference Full Buffers 50 that are available for searching.

Returning to FIG. 27A, if the Empty Count plus the number of entries in the Full Queue and Empty Queue is greater than or equal to the Full Count, decision Step 954 directs control to Step 958. For each of the Empty Buffer Descriptors 668 in the Call Packet 956, Step 958 copies the Buffer Identifier to an entry in the Empty Queue 664, sets the Status to Available, and resets the Highest Word Filled and calculates the Full Buffer Word. The Full Buffer Word is set to 80% of the size of the Buffer. Step 960 activates the Reader Activity Processing if it is waiting for Empty Buffers 52.

Decision Step 962 tests whether all the Empty Buffers specified in Buffer Exchange Call Packet 956 were placed on the Empty Queue 664. If not, the Full Returned count is appropriately set and control is returned. If all the Empty Buffers cannot be returned, this processing is exited for two reasons. First, the queuing logic between the Buffer Exchange Processing and Reader Activity Processing requires that the Buffer Exchange Processing will never queue itself unless all Empty Buffers 52 provided on the call were saved. Second, the test at Step 954 could be invalid because it was made assuming that all the Empty Buffers would be returned.

Control is directed to Step 964 if all the Empty Buffers 52 were placed on the Empty Queue 664. Step 964 begins a processing loop in which Full Buffers 50 are identified and returned. Step 964 initializes the number processed to zero. Decision Step 966 tests whether the number processed is equal to the Full Count from the Buffer Exchange Call Packet 956. If there are more Full Buffers requested than have been processed, control is directed to Step 968. Step 968 locates a Full buffer Descriptor 668 in the Full Queue 666, and Step 970 locks the Full Queue. The Buffer Identifier from the Full Buffer Descriptor is copied into the Buffer Exchange Call Packet, the Full Buffer Descriptor in the Full Queue is marked as Null, and the number processed is incremented at Step 972.

Step 974 unlocks the Full Queue and Step 976 accumulates the Number of Granules Read based on the number of granules in the Full Buffer 50. Decision Step 978 tests whether all the Buffers on the Full Queue 666 have been processed. If not, control is returned to decision Step 966.

If there are more Full Buffers to process, decision Step 978 directs control to decision Step 980. Decision Step 980 tests whether the number of Full Buffers processed is equal to Full Count, that is the number requested. If so, control is returned to the caller. Otherwise, control is directed to decision Step 982 where the Wait Flag and Number Processed are examined. If at least one Full Buffer was found and the Wait Flag is set, control is directed to Step 984 where the Full Returned count in the Buffer Exchange Packet 956 is set appropriately.

If the Wait Flag is not set, decision Step 982 directs control to Step 986 where processing is suspended to wait for a Full Buffer from the Reader Activity Processing. The Reader Activity Processing activates the Buffer Exchange Processing when a Full Buffer is made available. When awakened, Step 988 resets the Full Buffer search to begin at the beginning of the Full Queue 666.

Having described an exemplary embodiment of the invention in the drawings and accompanying description, those skilled in the art will recognize that various modifications to the exemplary embodiment could be made without departing from the scope and spirit of the claims set forth below:

We claim:

1. In a data processing system capable of processing data at a predetermined rate, a subsystem for providing optimized access to a data file, comprising:

a plurality of input-output channel means for transmitting selected portions of the data file to or from the data processing system;

a plurality of direct access storage means coupled to the data processing system via said plurality of input-output channel means, for reading said selected portions of the data file stored in a predetermined placement on predetermined ones of said plurality of direct access storage means;

selection means operable on the data processing system for selecting said selected portions of the data file to read wherein each of said selected portions of the data file is associated with a logical relative address indicative of the position of said selected portion of the data file within the data file; and parallel read means for reading in parallel said selected portions of the data file in an optimal order as determined by said predetermined placement irrespective of said logical relative address and for providing said selected portions of the data file in parallel to the data processing system at a rate to optimally match the predetermined rate.

2. A system for parallel reading and processing of a data file, comprising:

a memory device;

an instruction processor coupled to said memory device, said instruction processor capable of processing the data file at a predetermined rate;

file processing control operable on said instruction processor, wherein said file processing control initiates a request to read selected portions of the data file, each of said selected portions having an associated logical relative address indicative of the relative position of said selected portion within the data file;

a file buffer established in said memory device and addressable by said file processing control, said file buffer capable of temporarily storing said selected portions of the data file for processing by said file processing control;

a plurality of input-output processors coupled to said memory device, each of said plurality of input-output processors having read and write access to said memory device and said file buffer being addressable by said plurality of input-output processors;

a plurality of direct access storage devices coupled to said plurality of input-output processors, wherein said selected portions of the data file are stored on predetermined ones of said plurality of direct access storage devices in a predetermined arrangement;

parallel file read control coupled to said file processing control and coupled to said plurality of input-output processors, said parallel file read control to issue multiple read requests to said predetermined ones of said plurality of direct access storage devices to read said selected portions of the data file at said predetermined rate during one or more parallel read accesses from said predetermined ones of said plurality of direct access storage devices, said multiple read requests to further cause ones of said plurality of input-output processors to write said selected portions of the data file to said file buffer at said predetermined rate during one or more parallel write accesses; and a file buffer manager coupled to said parallel file read control and coupled to said file processing control, said file buffer manager to coordinate writing said selected portions of the data file to said file buffer in parallel with reading said file buffer by said file processing control.

3. The system of claim 2, wherein said parallel file read control includes read request issue control to issue said multiple read requests in an optimal predetermined order based on said predetermined arrangement of said selected portions of the data file and irrespective of said associated logical relative addresses of said selected portions of the data file.

4. The system of claim 3, wherein said parallel file read control includes input-output component management control that limits pending ones of said multiple read requests within the system to a predetermined maximum selectable number.

5. The system of claim 4, wherein said input-output component management control includes direct access storage device management control, wherein said direct access storage device management control limits said multiple read requests by limiting ones of said multiple read requests pending to each of said plurality of direct access storage devices to a selectable predetermined number.

6. The system of claim 4, further including a plurality of channel adapters wherein each of said plurality of channel adapters is coupled to an associated one of said plurality of input-output processors and is further coupled to associated ones of said plurality of direct access storage devices, wherein said input-output component management control includes channel management control that limits ones of said multiple read requests pending to each of said plurality of channel adapters to a predetermined number.

7. The system of claim 4, wherein said input-output component management control includes input-output processor management control that limits ones of said multiple read requests pending to each of said plurality of input-output processors to a predetermined number.

8. A system for parallel reading and processing of a data file, comprising:

a memory device;

an instruction processor coupled to said memory device, said instruction processor capable of processing data at a predetermined rate;

file processing control operable on said instruction processor, wherein said file processing control initiates a request to read selected portions of the data file;

a file buffer established in said memory device and addressable by said file processing control, wherein said file buffer temporarily stores the data file for processing by said file processing control;

a set of empty buffers established in said file buffer;

a plurality of input-output processors coupled to said memory device, wherein each of said plurality of input-output processors has read and write access to said memory device and said file buffer is addressable by said plurality of input-output processors;

a plurality of direct access storage devices coupled to said plurality of input-output processors, wherein the data file is stored on selected ones of said plurality of direct access storage devices;

parallel file read control coupled to said file processing control and coupled to said plurality of input-output processors, wherein said parallel file read control issues multiple read requests in an optimal predetermined order to said selected ones of said plurality of direct access storage devices to read said selected portions of the data file from said selected ones of said plurality of direct access storage devices at said predetermined rate in one or more parallel read accesses and to write said selected portions of the data file to ones of said set of empty buffers in one or more parallel write accesses; and a file buffer manager coupled to said parallel file read control and coupled to said file processing control, wherein said file buffer manager coordinates writing ones of said selected portions of the data file to said file buffer in parallel with said file processing control reading different ones of said selected portions of the data file from said file buffer, wherein said file buffer manager includes a first buffer designator to designate ones of said set of empty buffers as full buffers when said ones of said set of empty buffers have been filled with data, whereby said full buffers may be read by said file processing control; and a second buffer designator to designate ones of said full buffers as being included in said set of empty buffers after data in said ones of said full buffers have been read by said file processing control, said ones of said set of empty buffers to be written by said plurality of input-output processors while said full buffers are read by said file processing control.

9. The system of claim 8, wherein said parallel file read control includes input-output component management control to limit said multiple read requests to a predetermined maximum number.

10. The system of claim 9, wherein said input-output component management control includes direct access storage device management control, wherein said direct access storage device management control limits said multiple read requests to said predetermined maximum number by limiting to a predetermined number ones of said multiple read requests being processed by each of said plurality of direct access storage devices.

11. The system of claim 9, further comprising a plurality of channel adapters wherein each of said plurality of channel adapters is coupled to an associated one of said plurality of input-output processors and is further coupled to an associated one of said plurality of direct access storage devices, wherein said input-output component management control includes channel management control that limits said multiple read requests to said predetermined maximum number by limiting to a predetermined number ones of said multiple read requests being processed by each of said plurality of channel adapters.

12. The system of claim 9, wherein said input-output component management control includes input-output processor management control that limits ones of said multiple read requests to a predetermined number being processed by each of said plurality of input-output processors.

13. In a data processing system including an instruction processor for executing a file processing program at a predetermined data rate, a memory device coupled to the instruction processor, and a plurality of direct access storage devices that are accessible to the instruction processor via a plurality of input-output channels and a plurality of input output processors, a method for parallel reading and processing a file, comprising the steps of:

storing the file on the plurality of direct access storage devices;

initiating by the file processing program a parallel read request to read selected portions of the file at the predetermined data rate;

establishing a file buffer having empty areas into which said selected portions of the file are written in parallel to create full areas;

issuing in a predetermined optimal order a plurality of read requests to selected ones of the plurality of direct access storage devices, wherein said plurality of read requests address said selected portions of the file;

writing during one or more parallel write accesses said selected portions of the file to one or more of said empty areas of said file buffer; and reading by the file processing program in parallel with said writing step predetermined ones of said selected portions in one or more of said full areas of said file buffer.

14. The method of claim 13, further including the step of limiting pending ones of said plurality of read requests existing within the system to a predetermined maximum number.

15. The method of claim 14, wherein said limiting step includes limiting ones of said plurality of read requests to a predetermined number for each of the plurality of direct access storage devices.

16. The method of claim 14, wherein said limiting step includes limiting ones of said plurality of read requests to a predetermined number for each of the plurality of input-output channels.

17. The method of claim 14, wherein said limiting step includes limiting ones of said plurality of read requests to a predetermined number for each of the plurality of input-output processors.

18. In a data processing system including an instruction processor for executing a file processing program at a predetermined processing rate, a memory device coupled to the instruction processor, and a plurality of direct access storage devices that are accessible to the instruction processor via a plurality of input-output channels and a plurality of input output processors, a method for parallel reading and processing a file, comprising the steps of:

storing the file on the plurality of direct access storage devices;

initiating by the file processing program a parallel read request to read selected portions of the file in a predetermined optimal order;

establishing a file buffer into which said selected portions of the file are written; establishing a set of empty buffers in said file buffer;

issuing a plurality of read requests to selected ones of the plurality of direct access storage devices, wherein said plurality of read requests address said selected portions of the file at the predetermined processing rate; writing in parallel said selected portions of the file to ones of said set of empty buffers;

designating said ones of said set of empty buffers as full buffers when said ones of said set of empty buffers have received ones of said selected portions of the file;

reading by the file processing program, in parallel with said writing step, said ones of said selected portions of the file from said full buffers; and designating ones of said full buffers as being included in said set of empty buffers after said ones of said selected portions of the file in said ones of said full buffers have been read by the file processing program.

19. The method of claim 18, further including the step of limiting ones of said plurality of read requests to a predetermined number pending within the data processing system.

20. The method of claim 18, further including the step of limiting ones of said plurality of read requests to a predetermined number allowed to be pending for each of the plurality of direct access storage devices.

21. The method of claim 18, further including the step of limiting ones of said plurality of read requests to a predetermined number allowed to be pending for each of the plurality of input-output channels.

22. The method of claim 18, further comprising the step of limiting ones of said plurality of read requests to a predetermined number allowed to be pending for each of the plurality of input-output processors.

\* \* \* \* \*